United States Patent
Emami et al.

(10) Patent No.: US 10,737,981 B2
(45) Date of Patent: Aug. 11, 2020

(54) METHOD FOR MAKING A LIGHTWEIGHT GYPSUM COMPOSITION WITH INTERNALLY GENERATED FOAM AND PRODUCTS MADE FROM SAME

(71) Applicant: UNITED STATES GYPSUM COMPANY, Chicago, IL (US)

(72) Inventors: Samar Emami, Chicago, IL (US); Salvatore C. Immordino, Trevor, WI (US); Robert H. Negri, Lake Villa, IL (US); David D. Pelot, Chicago, IL (US); Jeffrey F. Grussing, Trevor, WI (US); Juan Carlos Ruiz Castañeda, Nuevo Leon (MX); Christopher R. Nelson, Lindenhurst, IL (US); John Jason Roxburgh, Chicago, IL (US); Srinivas Veeramasuneni, Round Lake, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 126 days.

(21) Appl. No.: 15/711,583

(22) Filed: Sep. 21, 2017

(65) Prior Publication Data

US 2018/0099908 A1 Apr. 12, 2018

Related U.S. Application Data

(60) Provisional application No. 62/407,462, filed on Oct. 12, 2016.

(51) Int. Cl.

| | | |
|---|---|---|
| *C04B 28/14* | (2006.01) | |
| *C04B 38/02* | (2006.01) | |
| *C04B 22/04* | (2006.01) | |
| *C04B 22/10* | (2006.01) | |
| *C04B 40/00* | (2006.01) | |
| *C04B 22/06* | (2006.01) | |
| *C04B 22/14* | (2006.01) | |
| *C04B 38/10* | (2006.01) | |
| *C04B 111/00* | (2006.01) | |

(52) U.S. Cl.
CPC .......... *C04B 28/14* (2013.01); *C04B 22/068* (2013.01); *C04B 22/10* (2013.01); *C04B 22/148* (2013.01); *C04B 38/02* (2013.01); *C04B 38/10* (2013.01); *C04B 40/0046* (2013.01); *C04B 2111/0062* (2013.01); *C04B 2111/00698* (2013.01)

(58) Field of Classification Search
CPC ....... C04B 28/14; C04B 22/068; C04B 22/06; C04B 22/148; C04B 38/10
See application file for complete search history.

(56) References Cited

U.S. PATENT DOCUMENTS

| | | |
|---|---|---|
| 1,748,614 A | 2/1930 | Nelson |
| 1,901,057 A | 3/1933 | Roos |
| 1,970,663 A | 8/1934 | Lefebure |
| 2,078,199 A | 4/1937 | King |
| 2,451,446 A | 10/1948 | Parsons |
| 3,199,997 A | 8/1965 | Johnson |
| 3,359,146 A | 12/1967 | Lane et al. |
| 3,573,947 A | 4/1971 | William et al. |
| 3,878,278 A | 4/1975 | Miller et al. |
| 4,040,850 A | 8/1977 | Kyri et al. |
| 4,661,161 A | 4/1987 | Jakacki et al. |
| 4,724,242 A | 2/1988 | Vassileff |
| 4,804,688 A | 2/1989 | Vassileff |
| 4,820,754 A | 4/1989 | Negri et al. |
| 5,653,797 A | 8/1997 | Patel |
| 5,746,822 A | 5/1998 | Espinoza et al. |
| 5,779,786 A | 7/1998 | Patel |
| 6,238,476 B1 | 5/2001 | Sprinkle |
| 6,379,458 B1 * | 4/2002 | Immordino ......... C04B 20/1022 106/772 |
| 6,406,537 B1 | 6/2002 | Immordino |
| 6,409,825 B1 | 6/2002 | Yu et al. |
| 6,673,144 B2 | 1/2004 | Immordino, Jr. et al. |
| 6,740,395 B2 | 5/2004 | Halm et al. |
| 6,805,741 B1 | 10/2004 | Liu et al. |
| 6,884,830 B1 | 4/2005 | Hornaman |
| 7,759,416 B2 | 7/2010 | Liling |
| 7,767,019 B2 | 8/2010 | Liu et al. |
| 7,819,993 B2 | 10/2010 | Seki et al. |
| 7,842,218 B2 | 11/2010 | Bonetto et al. |
| 8,088,218 B2 | 1/2012 | Blackburn et al. |
| 8,142,915 B2 | 3/2012 | Blackburn et al. |

(Continued)

FOREIGN PATENT DOCUMENTS

| | | |
|---|---|---|
| AT | 9511 U1 | 11/2007 |
| BE | 419013 A | 12/1936 |

(Continued)

OTHER PUBLICATIONS

Data Sheet for Methocel. DuPont. (Year: 2019).*

(Continued)

*Primary Examiner* — Kara B Boyle
(74) *Attorney, Agent, or Firm* — Vorys, Sater, Seymour and Pease LLP; Pradip Sahu; Philip T. Petti

(57) ABSTRACT

A gypsum-based composition of calcium sulfate hemihydrate with (a) alum and calcium carbonate and/or (b) zeolite and sodium percarbonate for making foamed gypsum slurry. A method to make foamed gypsum slurry from the composition. A method to make foamed gypsum product from the composition. A cavity wall having a cavity filled with the foamed gypsum product.

13 Claims, 5 Drawing Sheets

(56) References Cited

U.S. PATENT DOCUMENTS

| | | |
|---|---|---|
| 8,616,153 B2 | 12/2013 | Abbott et al. |
| 8,642,346 B2 | 2/2014 | Immordino, Jr. et al. |
| 8,673,071 B2 | 3/2014 | Immordino, Jr. et al. |
| 8,975,321 B2 | 3/2015 | Cimaglio et al. |
| 9,174,881 B2 * | 11/2015 | Cimaglio ........... B65D 81/3266 |
| 9,279,054 B2 | 3/2016 | Schoenfeld et al. |
| 2003/0084980 A1 | 5/2003 | Seufert et al. |
| 2004/0168801 A1 | 9/2004 | Reddy et al. |
| 2006/0162839 A1 | 7/2006 | Seki et al. |
| 2006/0280898 A1 | 12/2006 | Lettkeman et al. |
| 2010/0175590 A1 | 7/2010 | Stevens et al. |
| 2011/0136945 A1 | 6/2011 | Martin et al. |
| 2012/0219785 A1 * | 8/2012 | Yu ........................... C04B 20/06 428/312.4 |

FOREIGN PATENT DOCUMENTS

| | | |
|---|---|---|
| CA | 2016321 A1 | 11/1991 |
| CA | 2241261 A1 | 6/1997 |
| CH | 383247 A | 10/1964 |
| CN | 101033127 A | 9/2007 |
| DE | 824105 C | 12/1951 |
| DE | 1250327 B | 9/1967 |
| DE | 1300459 B | 7/1969 |
| DE | 102014103252 A1 | 9/2015 |
| EP | 2045227 A1 | 4/2009 |
| EP | 2135933 A1 | 12/2009 |
| FR | 738997 A | 1/1933 |
| OA | 5831 A | 5/1981 |
| WO | 8603505 A1 | 6/1986 |
| WO | 2011096925 A1 | 8/2011 |

OTHER PUBLICATIONS

International Search Report and Written Opinion dated Mar. 19, 2018 for PCT/US2017/055819 to United States Gypsum Company filed Oct. 10, 2017.

* cited by examiner

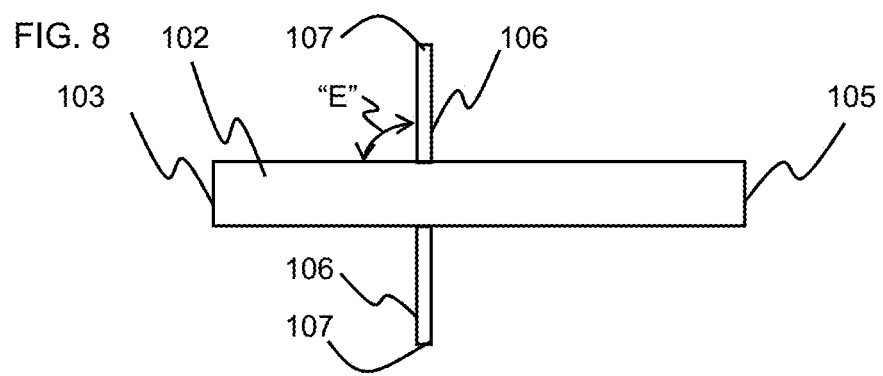
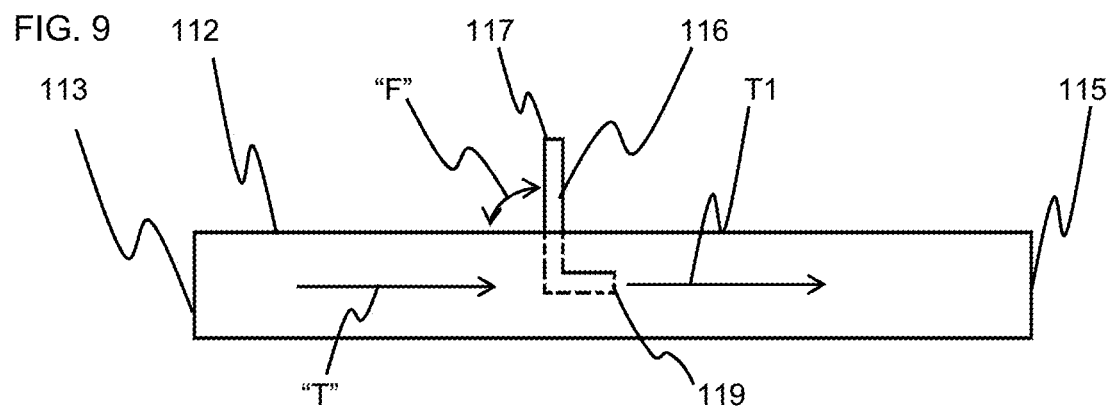

METHOD FOR MAKING A LIGHTWEIGHT GYPSUM COMPOSITION WITH INTERNALLY GENERATED FOAM AND PRODUCTS MADE FROM SAME

CROSS-REFERENCE TO RELATED APPLICATION

This claims the benefit of U.S. provisional patent application No. 62/407,462, filed Oct. 12, 2016, incorporated herein by reference.

FIELD OF THE INVENTION

This invention relates to a method and composition for preparing foamed gypsum slurry and gypsum product from the slurry with voids embedded in structure of the product. Uses for this product include application of this controllable rapid setting gypsum based foam material as cavity (large or small) or crack filler.

BACKGROUND

Typically, gypsum-containing cementitious products are made by preparing a mixture of calcined gypsum (calcium sulfate alpha or beta hemihydrate and/or calcium sulfate anhydrite), water, and other components, as appropriate to form cementitious slurry. In the manufacture of cementitious articles, the cementitious slurry and desired additives are often blended in a continuous mixer, as for example described in U.S. Pat. No. 3,359,146. For example, in a typical gypsum panel manufacturing process, gypsum board is produced by uniformly dispersing calcined gypsum (commonly referred to as "stucco") in water to form aqueous calcined gypsum slurry. The aqueous calcined gypsum slurry is typically produced in a continuous manner by inserting stucco and water and other additives into a mixer which contains means for agitating the contents to form uniform gypsum slurry. The slurry is continuously directed toward and through a discharge outlet of the mixer and into a discharge conduit connected to the discharge outlet of the mixer. Aqueous foam can be combined with the aqueous calcined gypsum slurry in the mixer and/or in the discharge conduit to make a foamed slurry.

It will be appreciated that this background description has been created by the inventors to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein. Thus, there is a continuing need for new and improved set gypsum-containing products, and compositions and methods for producing them, that solve, avoid, or minimize a problem noted above.

SUMMARY OF THE INVENTION

Rapid foaming of gypsum based materials is achieved through the chemical reaction between a carbonate source (such as calcium carbonate) and an acidic activator (such as aluminum sulfate). This chemical reaction produces carbon dioxide gas as a byproduct which is used as the foaming agent resulting in a final material with a controlled or tuned bubble structure. This invention/concept demonstrates the application of a controllable rapid setting gypsum based foam material as cavity (large or small) or crack filler.

A filler material with a low density and improved insulation properties (such as thermal, sound) can be achieved by using a foam structured material. The specific physical properties can be tuned for specific applications. These materials can be applied by spraying or filling, or other means in cracks/cavities/indentations. Once applied, chemical reactions cause internal generation of gas (carbon dioxide) causing expansion of the material which fills the gaps or voids. Or when poured as a foam, partial of mostly expanded, final stages of expansion will fill gaps or voids.

The amount and rate of foaming and expansion of the material is determined by the concentration of the raw materials and rate of the reaction before the slurry sets. The properties such as density, acoustic and thermal insulation, and mechanical properties in the wet or dry or cured state are also determined by the concentration of the raw materials and the rate of the reaction.

The gas generated foaming characteristics of this invention could be used in a variety of products including cavity infill, crack filler, insulation, gypsum panels, gypsum plasters, fireproofing sealants, lightweight ceiling tiles, joint compounds, coatings and texture products. A chemical reaction is not initiated until the powder is mixed with water, causing an evolution of gas within the cellular matrix. The initial reaction is delayed slightly, permitting manipulation of the wet mixture before the foaming process intensifies.

Thus, a filler material with a low density and improved insulation properties (such as thermal, sound, etc.) can be achieved by using a foam structured material. These materials can be applied by spraying or pouring or other means in any form such as cracks/cavities/indentations. Once applied or before in the mechanical device which applies the material, chemical reactions cause internal generation of gas (carbon dioxide) causing expansion of the material which fills the gaps or voids.

The invention provides a gypsum-based composition comprising a mixture of ingredients, based on 100 parts by weight of said ingredients on a dry (water not included) basis, comprising:
  50 to 98 wt. % calcium sulfate hemihydrate;
  a combination of compounds for generating a gas selected from the group consisting of:
    a first combination of 1.5 to 50 wt. %, preferably 3 to 20 wt. % calcium carbonate, and 1.5 to 30 wt. %, preferably 3 to 15 wt. %, at least one aluminum compound selected from the group consisting of aluminum sulfate and potassium aluminum sulfate, preferably aluminum sulfate, for generating CO2 gas; and/or
    a second combination of 1 to 10 wt. % zeolite, preferably naturally occurring zeolite, and a member of the group consisting of 1 to 10 wt. % hydrogen peroxide provided as a concentrated aqueous solution and 1 to 10 wt. % sodium percarbonate ($Na_2CaCO_3 \cdot 1.5H_2O_2$), for generating oxygen gas;
  preferably the mixture comprises the first combination;
  0.1 to 10 wt. %, preferably 0.2 to 5 wt. %, most preferably 0.2 to 3 wt. %, e.g., 0.2 to 0.71 wt. %, cellulose thickener; preferably the cellulose thickener is selected from at least one member of the group consisting of hydroxy propyl methyl cellulose, hydroxy ethyl methyl cellulose, hydroxy ethyl cellulose, methyl cellulose, methyl ethyl cellulose, ethyl cellulose, and carboxy methyl cellulose, most preferably comprising hydroxy propyl methyl cellulose.

Preferably the mixture ingredients further comprises, based on 100 parts by weight (on a dry, water free basis) of said ingredients of said mixture, at least one of:

0.1 to 1 wt. % chelating agent, preferably selected from
Diethylenetriaminepentaacetic acid (DTPA, also known as pentetic acid)
Ethylenediaminetetraacetic acid (EDTA)
Sodium polyacrylate
Polyphosphate, preferably Tetrasodium pyrophosphate (TSPP) and/or sodium tripolyphosphate (STMP), if the polyphosphate is present as a dispersant and a chelating agent the amount added as a chelating agent is in addition to the amount added as a dispersant,
more preferably the chelating agent is selected from sodium polyacrylate or Tetrasodium pyrophosphate, and most preferably the chelating agent is sodium polyacrylate;
0.05 to 1 wt. % biocide.

If desired the mixture ingredients may also include one or more of the following additives, based on 100 parts by weight of said ingredients of said mixture on a dry (water not included) basis:

0.1 to 10 wt. % acrylate thickener selected from at least one member of the group consisting of sodium polyacrylates and water-soluble copolymers based on acrylic and (meth) acrylic acid, preferably selected from at least one member of the group consisting of sodium polyacrylate, acrylic acid/acrylamide and (meth)acrylic acid/acrylic ester copolymers, most preferably sodium polyacrylate;

0.1 to 10 wt. % casein, gum arabic, guar gum, tragacanth gum, starch (from any base source), sodium alginate;

0.02 to 1 wt. % citric acid, tartaric acid, malic acid, acetic acid, boric acid, preferably citric acid;

0.02 to 2 wt. % a pH increasing salt, for example alkali metal salt of citric acid, sodium bicarbonate, and/or magnesium hydroxide, preferably at least one of sodium citrate, potassium citrate, sodium bicarbonate, or magnesium hydroxide, most preferably sodium citrate or magnesium hydroxide;

0.02 to 2 wt. % accelerator, the accelerator selected from the group consisting of potassium sulfate, an organic phosphonic compound, a phosphate-containing compound, and accelerator comprising calcium sulfate dihydrate and sugar, preferably the accelerator comprises calcium sulfate dihydrate and sugar;

0.1 to 5 wt. % preferably 0.5-3 wt. % foaming agent,
preferably the foaming agent is selected from the group consisting of alkyl benzene sulfonate, fatty acid salts, sodium lauryl sulfate, alkyl sulfate salts, sodium lauryl ether sulfate, sodium alkyl ether sulfate, (sodium C14-16 olefin sulfonate, alpha-olefin sulfonates, phosphate esters, sulphosuccinates, alkyl phenol ether sulfates, and isethionates,
more preferably alpha-olefin sulfonate, alkyl sulfonates, alkylbenzolfulfonates and alkyl ether sulfate oligomers,
furthermore preferably at least one member of the group consisting of sodium lauryl ether sulfate, ammonium C10-C12 alcohol ether sulfate, sodium C14-16 olefin sulfonate, and sodium polypropoxy-polyethoxy-decyl sulfate (molecular formula $C_{10}H_{22}$—O($C_3H_6$—O$C_2H_4$—O)$_x$—$H_2SO_4$—Na),
most preferably a mixture comprising 20 to 25% butyl diglycol, 7 to 15% sodium lauryl ether sulfate, and 3 to 5% alcohols 010-016;

1 to 20 wt. %, preferably 5 to 10 wt. %, latex polymer, preferably the latex polymer is selected from at least one member of the group consisting of polyvinyl acetate latex, polyvinyl acrylate and polyvinyl chloride latex, acrylics, styrene acrylics, acrylic esters, vinyl acrylics, vinyl chloride, vinyl chloride acrylic, styrene acetate acrylics, ethylene polyvinyl acetate, styrene butadiene, and combinations thereof, more preferably the latex polymer is selected from at least one member of the group consisting of acrylic polymer and styrene butadiene polymer, 0.01 to 1 wt. % 2-amino-2-methyl-1-propanol;

0.05 to 2 wt. %, typically 0.1 to 2 wt. %, polycarboxylate dispersant, preferably the polycarboxylate dispersant comprises a polycarboxylic ether dispersant;

0.05 to 2 wt. %, typically 0.1 to 2 wt. %, polyphosphate dispersant, preferably the polyphosphate dispersant is selected from at least one member of the group consisting of sodium trimetaphosphate (STMP), sodium tripolyphosphate (STPP), potassium tripolyphosphate (KTPP), tetrasodium pyrophosphate (TSPP), and tetrapotassium pyrophosphate (TKPP), more preferably the polyphosphate dispersant is sodium trimetaphosphate (STMP) or tetrasodium pyrophosphate (TSPP), most preferably the polyphosphate dispersant comprises sodium trimetaphosphate (STMP), wherein if the polyphosphate is present as a dispersant and a chelating agent (as discussed elsewhere in the specification) the amount added as a chelating agent is in addition to the amount added as a dispersant, for example, when 0.05 to 2 wt. %, typically 0.1 to 2 wt. %, polyphosphate, is present as a dispersant and 0.1 to 1 wt. % polyphosphate is added as a chelating agent then the composition has 0.15 to 3 wt. %, typically 0.2 to 3 wt. %, total polyphosphate;

0.01 to 2 wt. %, typically 0.1 to 2 wt. %, naphthalene dispersant or lignosulfonate dispersant, preferably the naphthalene dispersant is selected from at least one of beta-naphthalene sulfonate, naphthalene sulfonate formaldehyde condensate and sodium naphthalene sulfate formaldehyde condensate, preferably the lignosulfonate;

0.01 to 0.5 wt. % silicon based defoamer, 1 to 5 wt. % inorganic particles selected from clay, pigment particles, and combinations thereof, preferably the pigment particles comprises titanium dioxide;

0.05 to 1% Polyethylene Oxide (PEO).

For example, the mixture may comprise 0.05 to 1% Polyethylene Oxide (PEO) but not the other additives. Or, for example the mixture may comprise 0.05 to 1% Polyethylene Oxide (PEO) and one or more of the other additives.

The latex polymer may be added as a dry redispersible powder or as part of a latex comprising surfactant and the latex polymer dispersed as solids in aqueous medium. Typical latex is 40 to 60 wt. % latex polymer.

Preferably the gypsum-based composition comprises the ingredients comprising, based on 100 parts by weight of said ingredients:

50 to 98 wt. % calcium sulfate hemihydrate;
1.5 to 50 wt. %, more preferably 3 to 40 wt. % calcium carbonate;
1.5 to 30 wt. %, more preferably 3 to 20 wt. %, aluminum sulfate;
0 to 1 wt. % citric acid;
0 to 2 wt. % sodium citrate;
0 to 2 wt. % the accelerator comprising calcium sulfate dihydrate and sugar;
0.2 to 3 wt. %, cellulose thickener comprising hydroxy methyl propyl cellulose;
0-3 wt. % said foaming agent, wherein said foaming agent is selected from the group consisting of alkyl benzene sulfonate, fatty acid salts, sodium lauryl sulfate, alkyl sulfate salts, sodium lauryl ether sulfate, sodium alkyl ether sulfate, sodium C14-16 olefin sulfonate, alpha-olefin sulfonates, phosphate esters, sulphosuccinates, alkyl phenol ether sulfates, and isethionates;

0 to 20 wt. %, latex comprising surfactant and latex polymer dispersed as solids in aqueous medium, the latex polymer is selected from at least one member of the group consisting of acrylic polymer and styrene butadiene polymer;

0 to 1 wt. % 2-amino-2-methyl-1-propanol;

0 to 1 wt. % modifier comprising calcium hydroxide;

0.1 to 2 wt. % dispersant selected from at least one member of the group consisting of polycarboxylate dispersant, polyphosphate dispersant, and naphthalene dispersant;
  wherein the polycarboxylate dispersant comprises a polycarboxylic ether dispersant,
  wherein the naphthalene dispersant is selected from at least one of beta-naphthalene sulfonate, naphthalene sulfonate formaldehyde condensate and sodium naphthalene sulfate formaldehyde condensate,
  wherein the polyphosphate dispersant is selected from at least one member of the group consisting of sodium trimetaphosphate (STMP), sodium tripolyphosphate (STPP), potassium tripolyphosphate (KTPP), tetrasodium pyrophosphate, and tetrapotassium pyrophosphate (TKPP), more preferably the polyphosphate dispersant is sodium trimetaphosphate (STMP) or tetrasodium pyrophosphate (TSPP), most preferably the polyphosphate dispersant comprises sodium trimetaphosphate (STMP);

0 to 2 wt. % acrylate thickener selected from at least one member of the group consisting of sodium polyacrylate, acrylic acid/acrylamide and (meth)acrylic acid/acrylic ester copolymers, most preferably sodium polyacrylate;

0 to 1 wt. % chelating agent comprising one or more of:
  Diethylene triamine pentaacetic acid (DTPA, also known as pentetic acid)
  Ethylene diamine tetraacetic acid (EDTA)
  Sodium polyacrylate
  Polyphosphate, preferably tetrasodium pyrophosphate (TSPP), wherein if the polyphosphate is present as a dispersant and a chelating agent the amount of polyphosphate added as a chelating agent is in addition to the amount of polyphosphate added as a dispersant, thus, when 0.1 to 2 wt. % polyphosphate is present as a dispersant and 0 to 1 wt. % polyphosphate is present as a chelating agent then the composition has 0.1 to 3 wt. % total polyphosphate, more preferably the chelating agent is selected from sodium polyacrylate or tetrasodium pyrophosphate, and most preferably sodium polyacrylate;

0 to 1 wt. % biocide, typically 0.05 to 1 wt. % biocide;

0 to 0.5 wt. % silicon based defoamer, 0 to 5 wt. % inorganic particles selected from clay, pigment particles, and combinations thereof, preferably the pigment particles comprise titanium dioxide, 0-10% wt. % lightweight aggregate, such as perlite (coated and uncoated) or polystyrene).

The invention also provides a method of making a foamed gypsum slurry, comprising mixing:
  water; and
  the above-listed gypsum-based composition ingredients of the invention to form the foamed gypsum slurry, wherein the water to calcium sulfate hemihydrate weight ratio is 0.2-2:1;
  wherein the foamed gypsum slurry has 15 to 90 volume percent gas bubbles, preferably 40 to 85 volume percent gas bubbles, more preferably 50 to 80 volume percent gas bubbles. The water, of the water to calcium sulfate hemihydrate weight ratio of 0.2-2:1, being in addition to water of any added latex aqueous medium.

The invention also provides a method of making a foamed gypsum product, comprising mixing:
  water; and
  the above-listed gypsum-based composition ingredients of the invention to form the above-listed foamed gypsum slurry,
  wherein the water to calcium sulfate hemihydrates weight ratio to 0.2-2:1;
  wherein calcium sulfate hemihydrate in the foamed gypsum slurry converts to calcium sulfate dihydrate and sets and dries to form the foamed gypsum product,
  wherein the foamed gypsum product resulting from the set and dried foamed gypsum slurry has a density of 10 to 55 pounds/cubic foot,
  wherein the foamed gypsum product has a total void volume of 30 to 90 volume percent.

For instance for the foamed gypsum slurry and the foamed product the gypsum-based composition ingredients of the invention comprise a mixture of ingredients, based on 100 parts by weight of said ingredients on a water free basis, comprising:
  50 to 98 wt. % calcium sulfate hemihydrate;
  a combination of compounds for generating a gas selected from:
    a first combination of 1.5 to 50 wt. % calcium carbonate and 1.5 to 30 wt. % at least one aluminum compound selected from aluminum sulfate and potassium aluminum sulfate for generating CO2 gas; and/or
    a second combination of 1 to 10 wt. % zeolite, and a member of the group of 1 to 10 wt. % hydrogen peroxide provided as a concentrated aqueous solution and 1 to 10 wt. % sodium percarbonate ($Na_2CaCO_3.1.5H_2O_2$), for generating oxygen gas;
  0.1 to 10 wt. % cellulose thickener.

The invention also comprises a cavity wall system comprising:
  opposed board panels, preferably wall board panels, such as gypsum board panels or cement board panels, most preferably gypsum board panels, attached to a frame comprising studs to define a cavity between the opposed panels, typically the panels are vertical board panels;
  the foamed gypsum product resulting from the set and dried foamed gypsum slurry located within the cavity, the foamed gypsum product having the density of 10 to 55 pounds/cubic foot, wherein the foamed gypsum product has a total void volume of 30 to 90 volume percent.

As used herein, the term, "calcined gypsum", is intended to mean alpha calcium sulfate hemihydrate, beta calcium sulfate hemihydrate, water-soluble calcium sulfate anhydrite, or mixtures of any or all thereof, and the terms, "set gypsum" and "hydrated gypsum", are intended to mean calcium sulfate dihydrate. The water in the mixture reacts spontaneously with the calcined gypsum to form set gypsum.

In the present specification, all percentages and ratios are by weight unless otherwise indicated; and all molecular weights are weight average molecular weights unless otherwise indicated.

In the present specification, any mention of cavity, infill, filler, or any similar wording is purposely open ended and can mean any cavity made from any material in any shape and the final result can be a composite (of any number of materials) or single material.

DESCRIPTION OF THE DRAWINGS

FIG. 8 shows a connector conduit with multiple inlets.

FIG. 9 shows a connector conduit with a coaxial feed.

DESCRIPTION OF PREFERRED EMBODIMENTS

Figure 1:
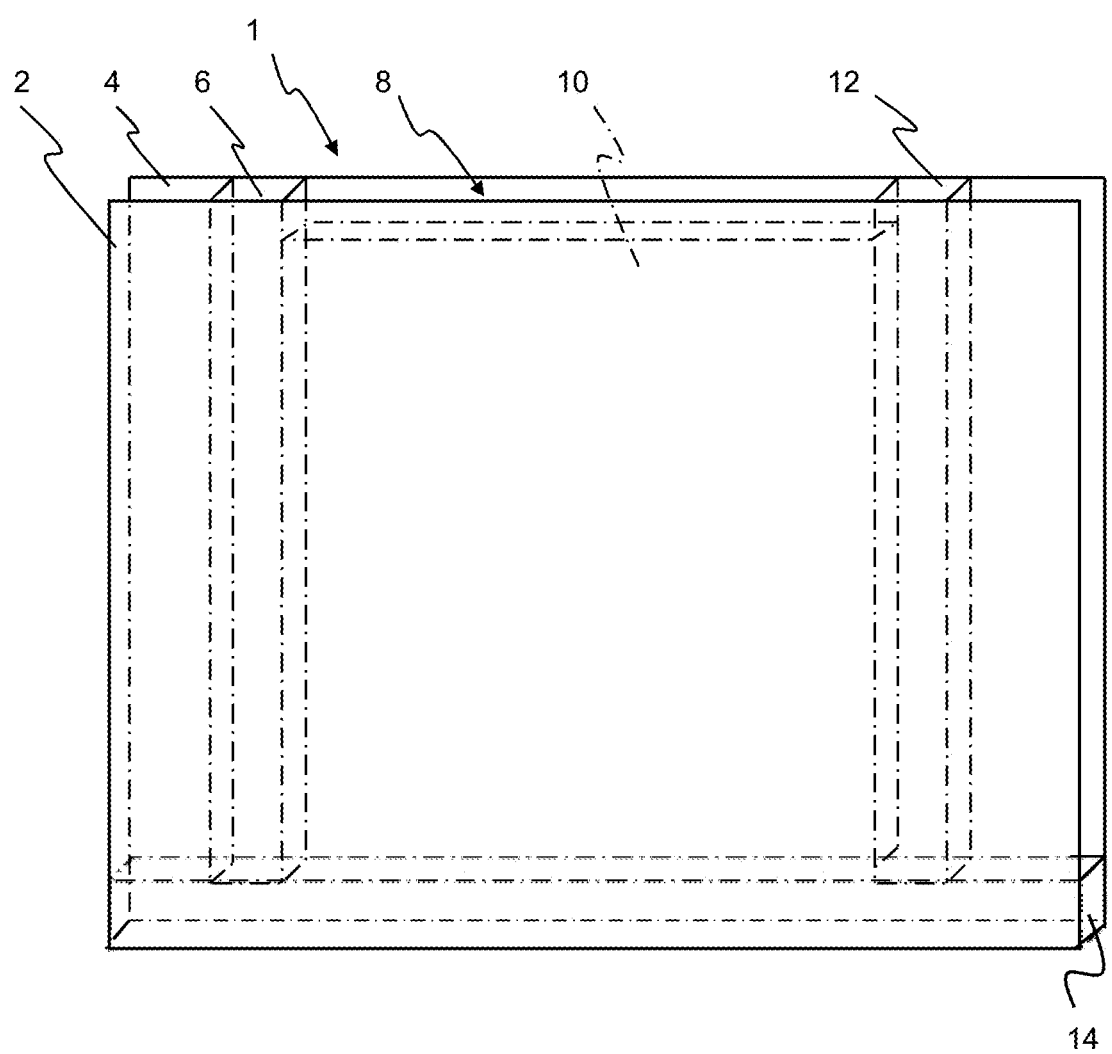
FIG. 1 shows a cavity wall system of the present invention.

This invention demonstrates a controllable rapid foaming/rapid setting gypsum based material. Rapid expanding foamed gypsum material can be spray applied or pumped.

Applications for this technology include, in part or collectively, the concepts and/or product applications below:

1) In-fill material for framed construction, metal door frame/commercial construction wall assembly applications, shaft wall assemblies.

2) On site cast in place construction blocks and/or extruded block, partial wall, full wall assemblies.

3) Improved Fire-Stop applications.

4) Replacement as a 0-VOC material for higher VOC caulks, sealants, compounds, expanding urethane foam.

5) Thermal insulating material applications.

The present invention provides a new method for creating gypsum slurry and set gypsum product with air voids embedded in the structure. This is able to trap and contain internally generated gas causing the bulk material to expand. In versions of the invention employing aluminum sulfate (acid) and calcium carbonate (base), the internally generated gas used for expansion results from an acid-base chemical reaction between aluminum sulfate (acid) and calcium carbonate (base), which generates carbon dioxide ($CO_2$) gas. The typical chemical reaction that describes how aluminum sulfate and calcium carbonate react to create carbon dioxide gas is shown as formula (I):

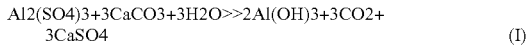

$$Al_2(SO_4)_3 + 3CaCO_3 + 3H_2O \gg 2Al(OH)_3 + 3CO_2 + 3CaSO_4 \quad (I)$$

The $CO_2$ is generated due to formation of an unstable compound, aluminum carbonate, and decomposition of aluminum carbonate to generate $CO_2$ as a byproduct in the system. Incorporating voids into a medium has been known for many years to enhance certain properties within the material (thermal resistance, acoustics, etc.). Incorporating voids into a medium can be done using various methods:

1. Compressing the gas under pressure (such as carbonated water)

2. Injecting the gas in the medium (such as conventional gypsum panel creation)

3. Internally generating the gas in the medium (the present invention)

The present invention internally generates the gas within the medium through the chemical reaction discussed above. This invention can be exploited in various applications. The resulting foamed gypsum slurry can be employed to fill the cavity in cavity wall construction. For example, the cavity wall construction system comprises two gypsum panels, studs and fiberglass insulation (in some cases insulation is not used). However, the present invention provides wall systems utilizing novel self-foaming gypsum based slurry as cavity infill material for cavity wall construction.

Thus, the present invention provides a low-density cavity wall system with enhanced mechanical and insulating properties including acoustics and heat transfer (R-value).

Discussion of Gas Generation

Normally when a gas is generated internally in a fluid, a part of it will be dissolved in the liquid surrounding it, a part of it diffuses in the medium, and part will escape the medium. To make a low-density foam material with improved acoustical, fire resistance properties, and heat insulation, the gas must be trapped inside the fluid and prevent its diffusion, dissolution, and mobility in the slurry to retain the bubble structure. When the generated gas is trapped inside the slurry it results in the expansion of the material only when the slurry has the proper rheological properties. The rate of the expansion depends on the kinetics of the chemical reaction and the dynamics of the bubble growth. The potential level of expansion depends on the amount of the reactants calcium carbonate and aluminum sulfate and their stoichiometric ratios.

The ability of the fluid to expand to its maximum potential, based on the number of reactants, is governed by the rheological properties.

The key factor is modification of the rheological properties of the fluid. The present invention achieves this using various rheology modifiers:

Organics such as:
Cellulosic Thickeners
Dispersants
Alcohols
Inorganics such as:
Clays The cellulosic thickener provides viscosity and elasticity and has little to no impact on the hydration and strength of gypsum crystals. This is not the case with other bubble stabilizing materials such as surfactant, dispersants, and alcohols. These are the main reasons why cellulosic thickeners are special in this foamed gypsum material but also make the formulation non-obvious and unique.

In the present invention, aluminum sulfate and calcium carbonate react when mixed in water to generate CO2 internally and the plaster (stucco) slurry expands to a certain degree. However, without using rheology modifiers in the gypsum based slurry, the material will not be able to reach its maximum expansion potential or will collapse after reaching that potential.

One of the uses of the material produced by the present invention is to be used as insulation, which relevant properties include:

1. Mechanical: Adhesion, Impact, Compressive, Tensile
2. Thermal: R-Value, Fire resistance
3. Acoustical: STC
4. Density: Low, medium, high depending on the application Controlling the Reaction by Encapsulation The present invention is based on an acid-base reaction which takes place rapidly upon mixing of the reactants and generation of the gas starts immediately, generally within ten, preferably within five seconds, as the alum (also known as aluminum sulfate and/or potassium aluminum sulfate) encounters the calcium carbonate particles. However, rapid kinetics of the acid/base reaction make it difficult to entrap the gas in the slurry during the mechanical/manual mixing of the slurry and pouring it in the wall cavity. It is also challenging for the user to custom mix it on the job site, considering the time needed to fully disperse the alum in the slurry using a mechanical/manual mixer. Encapsulation of the alum powder particles in a shell results in a controlled release of the powder when adequate shear force is applied to the encapsulated particles in the slurry during the mixing process. Applying shear stress during mixing of the slurry will rupture the shell and expose the alum to the slurry. Chemical reaction will, then, begin once the alum particles are dispersed uniformly in the slurry which will results in the expansion of the gypsum-based material. The method of controlled release of the powder will ensure the gas will not escape the system during the mixing and pouring processes.

Encapsulated controlled release of an active ingredient, for example the aluminum compound (alum) is classified in two categories:
1) A first group in which the release is governed by the rate of water permeation through a polymeric or copolymeric membrane of the capsules, and by the rate of alum or sodium percarbonate diffusion away from each coated particle into the surrounding slurry.
2) A second group with relatively thick encapsulating coats in which release of the active ingredient is governed mainly when the capsules are broken by pressure or shear force.

Any of the active ingredients, namely aluminum compound and/or zeolite, or calcium carbonate and/or sodium percarbonate, which react to cause foaming can be encapsulated to control release.

Encapsulation (coating) can be achieved by different methods:
1) Alginate Encapsulation
2) Polyoxymethylene Urea Microencapsulation
3) Complex Coacervation (Gelatin) Microencapsulation
4) Gel Beads The coating materials generally used for coating are:
1) Ethyl cellulose
2) Polyvinyl alcohol
3) Gelatin
4) Sugar
5) Sodium alginate Thus, the aluminum compound may be fed to the mixture as alum powder particles encapsulated in a shell and there is a controlled release of the alum powder when sufficient shear force is applied to the encapsulated alum powder particles in the slurry during the mixing. Or, the calcium carbonate may be encapsulated with a coating comprising a member of the group consisting of ethyl cellulose, polyvinyl alcohol, gelatin, sugar, and sodium alginate. Or, the calcium carbonate may be encapsulated with a coating comprising a member of the group consisting of ethyl cellulose, polyvinyl alcohol, gelatin, sugar, and sodium alginate.

Other Gas Generating Methods

The invention can have either $O_2$ or $CO_2$ or a combination of both or any gas if the gas causes the expansion and the slurry can expand due to the gas pressure based on the slurry properties. Thus, another method of generating a gas internally and in a controlled fashion is using a catalytically-driven decomposition reaction which generates $O_2$. Expansion of the materials occurs much more slowly than the $CO_2$ generating reaction which makes this reaction suitable for certain applications with more controllability. A concentrated solution of hydrogen peroxide in presence of zeolite, typically naturally occurring zeolite, as a catalyst liberates oxygen and produces gas to form a cellular foamed material. Natural zeolites are volcanic minerals having a rigid, three dimensional crystalline structures and high surface area which provides for many special properties in such applications as cation exchange, gas separation, and gas adsorption. The use of zeolite in combination with sodium percarbonate ($Na_2CaCO_3.1.5H_2O_2$) chemically also generates a cellular composition through the catalytic conversion of hydrogen peroxide. Thus, this idea encompasses the use of zeolites in combination with sodium percarbonate (Na2CaCO3.1.5H2O2) to chemically produce a cellular composition through the catalytic conversion of hydrogen peroxide.

Products produced using this gas generation system may contain other additives such as polymers, aggregates, thickeners, binders, fibers, surfactants, chemical oxidizers, and set control admixtures to name a few.

A chemical reaction is not initiated until the powder is mixed with water, causing an evolution of oxygen gas within the cellular matrix. The initial reaction is delayed slightly, permitting manipulation of the wet mixture before the foaming process intensifies.

The chemical interaction of naturally occurring zeolite minerals composed of sodium aluminosilicate with sodium percarbonate ($Na_2CaCO_3.1.5H_2O_2$) produces a gas generated cellular composition through the catalytic conversion of hydrogen peroxide. The unique honeycomb zeolite matrix, composed of a vast network of open channels high internal surface area, can chemically decompose hydrogen peroxide into water and oxygen gas.

The invention could also use synthetic zeolites.

These ingredients may be encapsulated using materials and methods as discussed above for alum and calcium carbonate. Thus, the zeolite may be fed to the mixture as zeolite particles encapsulated in a shell and there is a controlled release of the zeolite powder when sufficient shear force is applied to the encapsulated zeolite powder particles in the slurry during the mixing. Or, the sodium percarbonate may be encapsulated with a coating or shell. For example, the sodium percarbonate may be encapsulated with a coating comprising a member of the group consisting of ethyl cellulose, polyvinyl alcohol, gelatin, sugar, and sodium alginate.

Ingredients of the System and their Purpose:
The slurry of the present invention comprises
Water: used to provide a medium for powders to react, hydrate, dissolve, have mobility, etc.
Stucco (Calcium Sulfate hemihydrate), used for the following reasons:
   Setting properties, therefore, provides strength and dry density
   Ability to control/manipulate its setting properties (time and final microstructure), therefore, control desired crystal structure.
   Fire properties, therefore, provides safety
Aluminum Sulfate (Alum), used for the following reasons:
   Source of gas generation
Calcium Carbonate, used for the following reasons:
   Filler
   Source of gas generation
Typically the slurry includes one or more of the following additives:
   A retarder such as sodium citrate and an accelerator such as WGA, HRA or CSA to control the setting properties of gypsum.
   Chelating agents: Used to suspend gypsum set in applications where longer working time (workability) is desired. Able to suspend the set indefinitely.

Antimicrobial: Ensures resistance to microbial growth which will have an impact on the product performance.
pH modifiers: Enables rapid hydration of the rheology modifiers and impact rheology. They target coated cellulosic thickeners.
Coating reactants such as PVOH and sugar
Rheology modifiers, used to:
  Help stabilize the bubble structure
  Contain the gas in the slurry causing expansion
  Control diffusion of the gas and gas escape
  Control bubble coalescence
  Control upward mobility of the bubbles
  Prevent water drainage from bubble walls
  Prevent from settling of solids (water/solid separation)
  Prevent phase separation
Unique rheological properties can act very fluid during mixing enabling easy dispersion but act thick when at rest which retards bubble mobility
Examples of Specific Formulation Components:
Below are listed examples of various required and optional ingredients for making the slurry.
Water
Stucco (calcium sulfate hemihydrate)
Calcium carbonate
Sodium citrate
Sodium trimetaphosphate
Rheology Modifiers
PEO (polyethylene oxide)
PVOH (polyvinyl alcohol)
Latex
Soap
Dispersants
Superplasticizers, for example polynaphthalene sulfonates, polyacrylates, polycarboxylate ether-based (PCE) superplasticizers, etc.).
Starch
PCM (Phase Change Materials) PCMs are materials with high latent heat. They are added for the collection of heat when temperatures are higher and release heat when temperatures are lower to maintain the temperature within a room.
HPMC (hydroxy propyl methyl cellulose)
HEMC (hydroxy ethyl methyl cellulose)
HEC (hydroxy ethyl cellulose)
MC (methyl cellulose)
MEC (methyl ethyl cellulose)
EC (ethyl cellulose)
CMC (carboxy methyl cellulose)
Clay
Zeolite
CSA (Climate stabilized accelerator)
HRA (Heat resistant accelerator)
WGA (Wet gypsum accelerator)
2-amino-2-methyl-1-propanol
Chelating agent
Diethylenetriaminepentaacetic acid (DTPA)
Ethylenediaminetetraacetic acid (EDTA)
Sodium polyacrylate
Polyphosphate, preferably tetrasodium pyrophosphate (TSPP)
Antimicrobial agent
Acrylate thickener or dry equivalent
Citric Acid retarder
Suma proteinaceous retarder
Glass Fiber
Mineral Wool
Wax
Polyethylene Glycol (PEG)

Preparation of Materials/Process of Materials to Fill Wall Cavity
Method 1: Batch or Semi Continuous Batch Mixing
  Slurry Making
  Typically the dry components are pre-mixed. For example when making foamed slurry for use as cavity wall filler the dry (water free) components are already mixed before arriving at the jobsite. The order of addition of the dry components is not important. Thus, prior to entry into a mixer, All dry additives are added to the powdered gypsum.
  Then the dry components are mixed with water (Wet mixing) to create a chelated gypsum slurry. This can be done using a variety of batch mixing techniques which will depend of batch size, blade design and speed and orientation, water ratio, etc.
  The gypsum slurry from which the foamed gypsum product was made has a water to calcium sulfate hemihydrates weight ratio to 0.2-2:1.
  Also the material can be made into a slurry during the production phase and arrive at the jobsite as a ready to use state.
  Wet mixing of the slurry formulation can be done in high and low shear mixers (for example, a mixer which can operate at >10,000 rpm, or a mixer which can operate at 30 rpm). A significant advantage of the slurry of the present invention is that it can be made lump free in any mixing environment. Water demand varies with the formulation to maintain specific rheological properties and rendering particular bubble structures. Pre-blending the powders followed by mixing with water, results in uniform and lump-free slurry that does not:
    Set
    Settle (phase separation of solid/liquid)
    Spoil
  The slurry is made from gypsum (calcium sulfate hemihydrate), water, aluminum sulfate and calcium carbonate, and typically dispersant. In operation, to make the slurry the gypsum is fed to a slurry mixer. Water is also added. Some additives are added directly to the mixer. Other additives may be added to the water.
  The slurry hydraulic component comprises at least 70% calcium sulfate hemihydrate by weight, preferably at least 90% calcium sulfate hemihydrate by weight, more preferably at least 95% calcium sulfate hemihydrate by weight, based on the dry weight of the hydraulic component, typically it is 100% calcium sulfate hemihydrate.
  All components, except water, are premixed in a dry state.
  During normal batch process, then the slurry is pumped to a container/hopper/pail/drum using a pump. Then Alum (powder or solution) is added to wet gypsum based slurry. Alum Powder is advantageous for ease of handling, but requires specific introduction into slurry for desired dispersion. Alum solution is advantageous for having better dispersion into the slurry.
  During a semi-continuous batch process the material is slurried and sent to a holding area in which it is then pumped to mix with the alum. While the slurry is in transit to the holding area or when all the mixed slurry is in the holding area, a new batch can be started, therefore it is semi continuous.
Method 2: Continuous Mixing
  Premixed dry gypsum based material can be added to a feeder drive and fed into a continuous mixer. Continuous because the amount of water that is metered in is directly related to the amount of dry powder that is being fed into the mixer component and that the water, dry powder, and/or slurry is continuously passing through the system.

Method 3: Ready to Use Gypsum Slurry

Gypsum slurry can also be prepared through the manufacturing process, which includes but is not limited to the previous two methods, and then delivered to the jobsite in a ready to use state.

When the gypsum slurry and the alum are combined, if the alum is a powder then the gypsum slurry is pumped from the container while the alum will be introduced into the hose of the slurry, such as using a screw drive. If the alum is a solution, then the gypsum slurry is pumped from the container while the alum is pumped from the alum solution container. Mixing of the two could include a Y ("Wye") channel or T channel connection and/or a mixing device, such as a static mixer or dynamic mixer to provide a continuous mixing. Then the combined aluminum sulfate and calcium carbonate internally generate carbon dioxide gas within the slurry. A dynamic mixer is one that has moving parts, whereas a static mixer relies on the fluid moving past it for mixing to occur. The dynamic mixer is positioned in line. Thus, the invention contemplates adding the alum solution to a continuous mixer, more specifically the dynamic mixer, where it is mixed with the slurry.

In particular this provides a method of making foamed gypsum product, wherein the method is performed via batch, semi continuous batch, or continuous processing at a jobsite or as part of a manufacturing process, comprising:

mixing the calcium sulfate hemihydrate and the calcium carbonate with water to form a first slurry;

providing an Alum solution of the aluminum compound mixed with water;

passing the first slurry and the Alum solution through respective inlet openings of a connector conduit to combine in the connector conduit to create a combined mixed foaming stream which discharges from the connector conduit through a discharge opening of the connector conduit;

mixing the combined mixed foaming stream in a combined stream mixer selected from a static mixer or a dynamic mixer to activate at least a portion of the calcium carbonate by reacting the portion of the calcium carbonate with the aluminum compound to create the foamed gypsum slurry;

transferring the combined mixed foaming stream from the combined stream mixer to a cavity between two wall boards; and allowing the foamed gypsum slurry in the cavity to expand, harden and dry to foamed gypsum product.

Preferably the connector conduit is a Wye connector or a T-connector.

Figure 5:
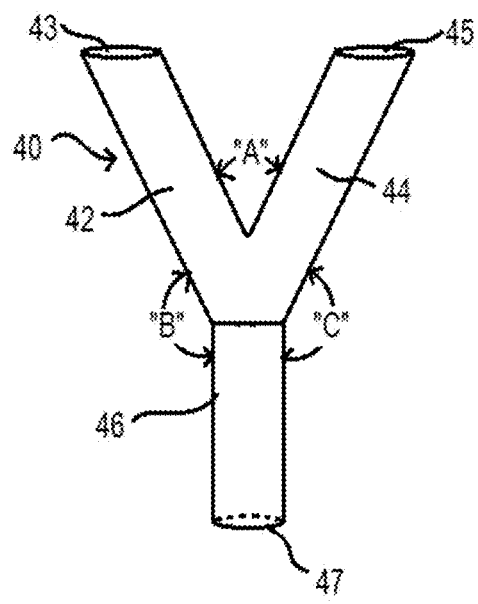
FIG. 5 shows a Wye connector.

FIG. 5 shows a Wye connector conduit 40. The Wye connector conduit 40 has a first side inlet pipe 42 defining a first said inlet opening 43 and a second side inlet pipe 44 defining a second said inlet opening 45 and a discharge pipe 46 defining a discharge opening 47. The Wye connector conduit first side inlet pipe 42 and the second side inlet pipe define 44 an acute angle "A". The Wye connector conduit 40 first side inlet pipe 42 and the discharge pipe 46 define a first obtuse angle "B". The Wye connector conduit second side inlet pipe 44 and the discharge pipe 46 define a second obtuse angle "C".

Figure 6:
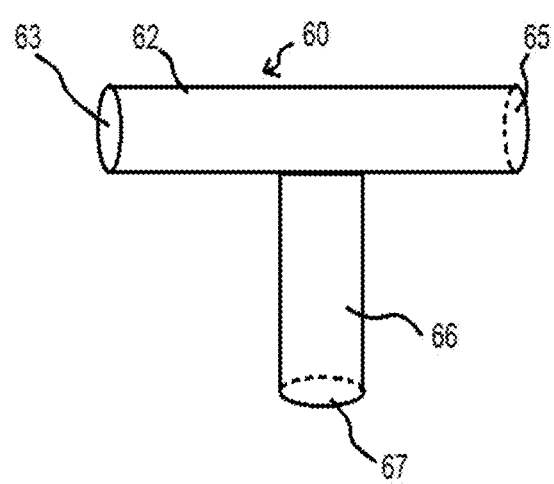
FIG. 6 shows a T-connector.

FIG. 6 shows a T-connector conduit 60. wherein the T-connector conduit 60 has a first pipe 62 having a first open end 63 opposed to a second open end 65 and a second pipe 66 in communication with the first pipe 62 and defining a third open end 67. The first pipe perpendicular 62 to the second pipe 66. One of the first open end 63, second open end 65 and third open end 67 is the first inlet opening. One of the first open end 63, second open end 65 and third open end 67 which is not the first inlet opening is the second inlet opening. The first open end 63, second open end 65 and third open end 67 which is not the first inlet opening or the second inlet opening is the discharge opening. For example, first open end 63 is the first inlet opening, second open end 65 is the second inlet opening and third open end 67 is the discharge opening.

Figure 7:
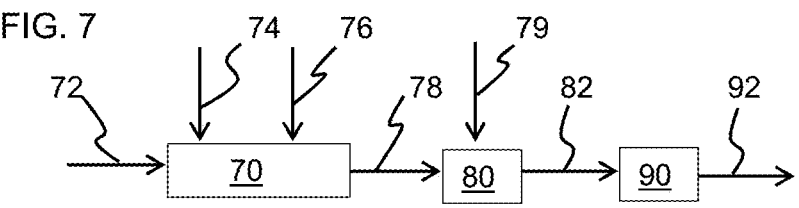
FIG. 7 shows a process flow diagram.

FIG. 7 shows a flow chart of the method using the connector conduit. The calcium sulfate hemihydrate 72 and the calcium carbonate 74 and water 76 are mixed in a mixer 70 to form a first slurry 78. First slurry 78 and alum solution 79 feed a connector conduit 80, preferably selected from a Wye connector conduit and a T-connector conduit, to combine in the connector conduit 80 to create a combined mixed foaming stream 82 which discharges from the connector conduit through a discharge opening. The combined mixed foaming stream 82 is mixed in a combined stream mixer 90 selected from a static mixer or a dynamic mixer to activate at least a portion of the calcium carbonate by reacting the portion of the calcium carbonate with the aluminum compound to create the foamed gypsum slurry. The combined mixed foaming stream discharges as stream 92 and is transferred from the combined stream mixer 90 to a cavity between two wall boards (such as the cavity 8 of FIG. 1). The foamed gypsum slurry in the cavity is allowed to expand, harden and dry.

FIG. 8 shows an alternative to a Wye connector or a T-connector is to feed the ingredients to the connector conduit through more than one inlet opening. For example, the first slurry may be fed through one inlet opening of a first conduit and the alum solution may be fed into multiple inlet openings of conduits spaced about the first conduit to feed the first conduit. This is shown in FIG. 8 presenting a connector conduit having a first pipe 102 having a first inlet open end 103 opposed to a second open discharge end 105 and second pipes 106 having inlet openings 107 and in communication with the first pipe 102. The second pipes 106 may intersect the first pipe 102 at an angle "E" which is perpendicular (as shown) or is less than 90 degrees. First open end 103 is the first inlet opening, second open end 107 is the second inlet opening and third open end 105 is the discharge opening.

FIG. 9 shows another alternative to a Wye connector or a T-connector is to feed the ingredients into a connector conduit with a coaxial discharge as for example shown by FIG. 9. FIG. 9 shows a connector conduit having a first pipe 112 having a first inlet open end 113 opposed to a second open discharge end 105 and a second pipe 116 having inlet opening 117 and a discharge opening 119 in communication with the first pipe 102. The first slurry feeds the first open end 113. The first slurry flow direction is shown as a direction "T". The connector conduit has a discharge opening 119 for discharging the alum solution in a direction "T1" coaxial with flow of the first slurry in the first pipe. The second pipe 116 may intersect the first pipe 112 at an angle "F" which is perpendicular (as shown) or is less than 90 degrees. First open end 113 is the first inlet opening, second open end 117 is the second inlet opening and third open end 115 is the discharge opening for the combined first slurry and alum solution.

The first slurry of calcium sulfate hemihydrate and calcium carbonate and the alum solution discussed above in the above mixing methods, for example the systems of FIGS. 5 through 9 may be replaced by a first slurry of calcium sulfate hemihydrate and zeolite and a sodium percarbonate solution or hydrogen peroxide solution.

If desired, a catalytically-driven decomposition reaction which generates $O_2$ within the slurry may also be employed to supplement the generated carbon dioxide gas. To generate $O_2$ a concentrated solution of hydrogen peroxide in the presence of naturally occurring zeolite as a catalyst liberates oxygen and produces gas to form a cellular foamed material. The use of zeolite in combination with sodium percarbonate ($Na_2CaCO_3.1.5H_2O_2$) chemically also generates a cellular composition by generating $O_2$ through the catalytic conversion of hydrogen peroxide.

After contact with water the gypsum (calcium sulfate hemihydrate) sets to convert to calcium sulfate dihydrate during production of the foamed gypsum product. Thus, once the alum and gypsum slurry are mixed to generate carbon dioxide (and if desired the ingredients to generate O2 are mixed), dispensing of the foaming material into the wall cavity can occur as a fully activated foam or a partially activated liquid that is foaming or any state between. Different application methods will be used depending on job site conditions and available equipment. The wall system, for example comprising studs and wall panels, for example, drywall panels, with a cavity filler will have higher mechanical, acoustical, and thermal resistance properties than the wall system comprising studs and wall panels without a cavity filler. Wall cavity infill can be any wall that has a cavity, for example, a combination of wall panels (for example gypsum board or cement board) and steel studs. Thus, for example, either gypsum boards or cement boards may be employed with this invention. However, cavity infill is not limited to uses with wall panels. The invention also contemplates filling the hollow core of foamed cellular concrete blocks.

FIG. 1 shows a cavity wall system 1 comprising studs 6, 12, 14 and gypsum drywall panels 2, 4, with a cavity 8 between the gypsum drywall panels 2, 4, and cavity filler 10 of the foamed gypsum of the present invention within the cavity 8.

The slurry from the slurry mixer for the gypsum core slurry then passes from the slurry mixer to a slurry distributor which deposits the slurry as desired. For example, it may be deposited in a wall cavity. The cavity itself can be temporary or permanent, on the job or at the production site, a composite system or single material. Under this broad definition, any space could be filled with this material or the material could be freely poured then formed.

Calcined Gypsum

As used herein, the term "calcined gypsum" is intended to mean alpha calcium sulfate hemihydrate, beta calcium sulfate hemihydrate, water-soluble calcium sulfate anhydrite, or mixtures of any or all thereof. Calcined gypsum is also known as stucco. The terms "gypsum", "set gypsum" and "hydrated gypsum" are intended to mean calcium sulfate dihydrate. The water in the mixture reacts spontaneously with the calcined gypsum to form set gypsum.

The calcined gypsum employed in the invention can be in the form and concentrations typically found useful in the corresponding embodiments of the prior art. It can be from natural or synthetic sources. The calcined gypsum can be fibrous in some embodiments and non-fibrous in others. Any form of calcined gypsum may be used, including but not limited to alpha or beta stucco. However, alpha calcium sulfate hemihydrate is preferably employed for its yield of set gypsum having relatively high strength. If desired beta calcium sulfate hemihydrate or a mixture of beta calcium sulfate hemihydrate and water-soluble calcium sulfate anhydrite are employed. The calcined gypsum can include at least about 50% beta calcium sulfate hemihydrate. In other embodiments, the calcined gypsum can include at least about 86% beta calcium sulfate hemihydrate. Use of calcium sulfate anhydrite, synthetic gypsum or landplaster is also contemplated, although preferably in small amounts of less than 20%.

Calcium Carbonate

Calcium carbonate is a chemical compound with the formula $CaCO_3$.

Aluminum Compound

The aluminum compound is selected from the group consisting of aluminum sulfate with the formula $Al_2(SO_4)_3$ and potassium aluminum sulfate, preferably it is aluminum sulfate.

Water

Water is added to the slurry in any amount that makes flowable slurry. The amount of water to be used varies greatly per the application with which it is being used, the exact dispersant being used, the properties of the stucco and the additives being used. The water to calcium sulfate hemihydrates weight ratio to 0.2-2:1.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical, preferably potable water.

Latex

The gypsum slurry of the present invention may comprise a latex polymer as a binder. In particular, the polymer is synthetic latex (i.e., an aqueous dispersion of polymer particles prepared by emulsion polymerization of one or more monomers). The latex comprises an aqueous emulsion or dispersion comprising water, the latex polymer, surfactant, and other ingredients as described elsewhere in the present specification. In the alternative the latex polymer may be added as a dry redispersible power.

The latex polymer is selected from at least one member of the group consisting of polyvinyl acetate latex, polyvinyl acrylate and polyvinyl chloride latex, acrylics, styrene acrylics, acrylic esters, vinyl acrylics, vinyl chloride, vinyl chloride acrylic, styrene acetate acrylics, ethylene polyvinyl acetate, styrene butadiene, and combinations thereof, and surfactant, preferably the latex polymer is selected from at least one member of the group consisting of polyvinyl acetate latex, polyvinyl acrylate and polyvinyl chloride latex, more preferably the latex polymer comprises polyvinyl acetate latex.

Methods for preparing synthetic latexes are well known in the art and any of these procedures can be used.

Particle size of the latex typically varies from 30 nm to 1500 nm.

Dispersant for the Gypsum Slurries

Dispersants are known for use with gypsum in gypsum slurries to help fluidize the mixture of water and calcium sulfate hemihydrate so less water is needed to make flowable slurry.

The gypsum slurries typically contain a dispersant such as polynaphthalene sulfonate. Polynaphthalene sulfonate dispersants are well known and relatively cheaper, but have limited efficacy. Polynaphthalene sulfonate has good compatibility with starch, foaming agents, and clays. A production process for polynaphthalene sulfonates includes the following reaction steps: sulfonation of naphthalene with sulfuric acid producing b-naphthalene-sulfonic acid, condensation of b-naphthalene sulfonic acid with formaldehyde producing polymethylene naphthalene sulfonic acid, and neutralization of polymethylene naphthalene sulfonic acid with sodium hydroxide or another hydroxide.

Polycarboxylate dispersants are suitable dispersants for gypsum slurries. Preferred polycarboxylate dispersants for gypsum slurries comprise a polycarboxylic ether dispersant, for example dispersant comprising a copolymer of an oxyalkylene-alkyl ether and an unsaturated dicarboxylic acid. Preferably the polycarboxylate dispersant comprises a copolymer of an oxyalkylene-alkyl ether and an unsaturated dicarboxylic acid.

U.S. Pat. No. 7,767,019 to Liu et al, incorporated by reference, discloses embodiments of branched polycarboxylates suitable for use as dispersants for the present gypsum slurries. These are also anionic surfactants. Liu et al discloses polycarboxylate dispersant consisting essentially of a first and a second repeating unit, wherein the first repeating unit is an olefinic unsaturated mono-carboxylic acid repeating unit or an ester or salt thereof, or an olefinic unsaturated sulphuric acid repeating unit or a salt thereof, and the second repeating unit is of the general formula (I)

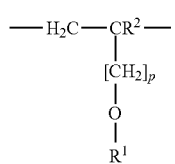
(I)

where $R^1$ is represented by formula (II):

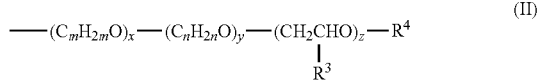
(II)

and wherein $R^2$ is hydrogen or an aliphatic $C_1$ to $C_5$ hydrocarbon group, $R^3$ is a non-substituted or substituted aryl group, and $R^4$ is hydrogen or an aliphatic $C_1$ to $C_{20}$ hydrocarbon group, a cycloaliphatic $C_5$ to $C_8$ hydrocarbon group, a substituted $C_6$ to $C_{14}$ aryl group or a group conforming to one of the formulae (III):

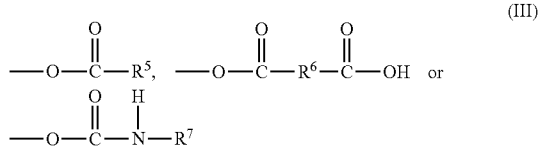
(III)

wherein $R_5$ and $R_7$, independently of each other, represent an alkyl, aryl, aralkyl or alkylaryl group and $R_6$ is a divalent alkyl, aryl, aralkyl or alkaryl group, p is 0 to 3, inclusive, m and n are, independently, an integer from 2 to 4, inclusive; x and y are, independently, integers from 55 to 350, inclusive and z is from 0 to 200, inclusive.

U.S. Pat. No. 8,142,915 to Blackburn et al, incorporated by reference, also discloses embodiments of polycarboxylates suitable for use as dispersants for the present gypsum slurries.

Preferably the naphthalene dispersant is selected from at least one of beta-naphthalene sulfonate, naphthalene sulfonate formaldehyde condensate and sodium naphthalene sulfate formaldehyde condensate.

Preferably the polyphosphate dispersant is selected from at least one member of the group consisting of sodium trimetaphosphate (STMP), sodium tripolyphosphate (STPP), potassium tripolyphosphate (KTPP), tetrasodium pyrophosphate (TSPP), and tetrapotassium pyrophosphate (TKPP), more preferably the polyphosphate dispersant is sodium trimetaphosphate (STMP) or tetrasodium pyrophosphate (TSPP), most preferably the polyphosphate dispersant comprises sodium trimetaphosphate (STMP).

In addition, suitable amino alcohols, such as, for example, 2-amino-2-methylpropanol, may be used as dispersants.

Additives for Gypsum Slurries

Additives can be employed in the gypsum slurries to impart desirable properties and to facilitate manufacturing, such as set accelerators, set retarders, recalcination inhibitors, binders, adhesives, dispersants, leveling or non-leveling agents, thickeners, bactericides, fungicides, pH adjusters, colorants, reinforcing materials, fire retardants, water repellents, fillers and mixtures thereof.

The gypsum slurry also optionally includes one or more modifiers that enhance the ability of the dispersant to fluidize the slurry, thus improving its efficacy. Preferred modifiers include lime, also known as quicklime or calcium oxide, slaked lime, also known as calcium hydroxide, soda ash, also known a sodium carbonate, and other carbonates, silicates, phosphonates and phosphates. Dosage of the modifier is from 0.05% to about 1% depending on the modifier being used and the application with which it is used. Additional information on modifiers and their use is found in U.S. Published Patent Application No. US 2006-0280898 A1, entitled "Modifiers for Gypsum Slurries and Method of Using Them", incorporated by reference.

Preferably both the modifier and the dispersant are in dry form, they can be pre-blended with each other and added with the stucco. A method for adding dispersants and modifiers to a stucco composition is disclosed in more detail in US 2006-0280898 A1, entitled "Modifiers for Gypsum Slurries and Method of Using Them", incorporated by reference.

Additional additives are also added to the slurry as are typical for the application to which the gypsum slurry will be put. Set retarders or dry accelerators are added to modify the rate at which the hydration reactions take place. Climate stabilized accelerator ("CSA") is a set accelerator comprising 95% calcium sulfate dihydrate co-ground with 5% sugar and heated to 250° F. (121° C.) to caramelize the sugar. CSA is available from USG Corporation, Southard, Okla. plant, and is made according to U.S. Pat. No. 3,573,947, herein incorporated by reference. Potassium sulfate is another preferred accelerator. Heat Resistant Accelerator (HRA) is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Both are preferred accelerators.

Another accelerator, known as wet gypsum accelerator (WGA), is also a preferred accelerator. A description of the use of and a method for making wet gypsum accelerator are disclosed in U.S. Pat. No. 6,409,825, herein incorporated by reference. WGA includes particles of calcium sulfate dihydrate, water, and at least one additive selected from the group consisting of (i) an organic phosphonic compound, (ii) a phosphate-containing compound, or (iii) a mixture of (i)

and (ii). This accelerator exhibits substantial longevity and maintains its effectiveness over time such that the wet gypsum accelerator can be made, stored, and even transported over long distances prior to use. The wet gypsum accelerator is used in amounts ranging from about 5 to about 80 pounds per thousand square feet (24.3 to 390 g/m$^2$) of board product.

Other potential additives to the invention are biocides and/or fungicides to reduce growth of mold, mildew or fungi. Depending on the biocide selected and the intended use for the cavity filling, the biocide can be added to the covering, the gypsum core or both. Examples of biocides include boric acid, pyrithione salts and copper salts. Biocides can be added to the gypsum slurry.

Glass fibers are optionally added to the slurry. Paper fibers are optionally added to the slurry. Wax emulsions or polysiloxanes are optionally added to the gypsum slurry to improve the water-resistance of the finished gypsum product. If stiffness is needed, boric acid is commonly added. Fire retardancy can be improved by the addition of vermiculite. These and other known additives are useful in the present slurry formulations.

The gypsum slurry may include starches to strengthen the product. Typical starches are corn starch, wheat starch, and potato starch. The starch may be a pregelatinized starch or an acid modified starch. One of ordinary skill in the art will appreciate methods of pregelatinizing raw starch, such as, for example, cooking raw starch in water at temperatures of at least about 185° F. (85° C.) or other methods. If included, the pregelatinized starch is present in any suitable amount. For example, if included, the pregelatinized starch can be added to the mixture used to form the set gypsum composition such that it is present in an amount of from about 0.5% to about 10% percent by weight of the set gypsum composition. Starches such as USG95 (United States Gypsum Company, Chicago, Ill.) are also optionally added for core strength.

Foaming Agent

Foaming agents can be employed in the gypsum slurries to produce additional foam to supplement the internally generated foam generated by an internal chemical reaction. These foaming agents may be any of the conventional foaming agents known to be useful in preparing foamed set gypsum products. Many such foaming agents are well known and readily available commercially, e.g., soap.

Preferably the foaming agent is selected from the group consisting of alkyl benzene sulfonate, fatty acid salts, sodium lauryl sulfate, alkyl sulfate salts, sodium lauryl ether sulfate, sodium alkyl ether sulfate, (sodium C14-16 olefin sulfonate, alpha-olefin sulfonates, phosphate esters, sulphosuccinates, alkyl phenol ether sulfates, and isethionates. More preferably alpha-olefin sulfonate, alkyl sulfonates, alkylbenzolfulfonates and alkyl ether sulfate oligomers. Furthermore, preferably at least one member of the group consisting of sodium lauryl ether sulfate, ammonium C10-012 alcohol ether sulfate, sodium C14-16 olefin sulfonate, and sodium polypropoxy-polyethoxy-decyl sulfate (molecular formula $C_{10}H_{22}$—O($C_3H_6$—O$C_2H_4$—O)$_x$—$H_2SO_4$—Na). Most preferably a mixture comprising 20 to 25% butyl diglycol, 7 to 15% sodium lauryl ether sulfate, and 3 to 5% alcohols 010-C16.

An example of one type of foaming agent has the formula $ROSO_3^-M^+$, wherein R is an alkyl group containing from 2 to 20 carbon atoms, and M is a cation. Preferably, R is an alkyl group containing from 8 to 12 carbon atoms. An example of one type of foaming agent, useful to generate stable foams, has the formula $CH_3(CH_2)_xCH_2(OCH_2CH_2)$ $yOSO_3^-M^+$, wherein X is a number from 2 to 20, Y is a number from 0 to 10 and is greater than 0 in at least 50 weight percent of the foaming agent, and M is a cation. Blends of these foaming agents may also be employed.

Polyvinyl alcohol (PVOH) may be added to the slurry as a foam stabilizing agent before the foam was generated in the cementitious slurry.

Additives

Additives which can be employed in the slurry in the practice of the invention to impart desirable properties and to facilitate manufacturing are selected from one or more members of the group silicon based defoamers, acrylate thickeners, cellulose thickeners, inorganic filler powder, pH adjuster, preferably alkanolamines, and pigments as well as the abovementioned dispersant.

The compositions of the invention comprise clay and/or an inorganic filler powder such as calcium sulfate dihydrate.

The clay may be calcined or not calcined. The term "calcined clays" is to be understood as clays having been submitted to a thermal treatment, e.g., heated, to drive off volatile compounds. Representative clays include, but are not limited to attapulgite, montmorillonite, nontronite, beidellite, volkonskoite, hectorite, saponite, sauconite; vermiculite; halloisite; sericite; or their mixtures.

The thickener is selected from at least one member of the group consisting of a cellulose thickener and an acrylate thickener. Preferred cellulose thickeners include hydroxy propyl methyl cellulose, hydroxy ethyl methyl cellulose, hydroxy ethyl cellulose, methyl cellulose, methyl ethyl cellulose, ethyl cellulose, and carboxy methyl cellulose, most preferably comprising hydroxy propyl methyl cellulose. The most preferred cellulose thickener is hydroxy methyl propyl cellulose.

Other potential thickeners are casein, gum arabic, guar gum, tragacanth gum, starch, sodium alginate.

Preferred acrylate thickeners are selected from one or more of sodium polyacrylates, water-soluble copolymers based on acrylic and (meth)acrylic acid, such as acrylic acid/acrylamide and (meth)acrylic acid/acrylic ester copolymers.

Also, the coating compositions may include thickeners selected from polyvinyl alcohol, associative thickeners, such as styrene/maleic anhydride polymers or preferably hydrophobically modified polyetherurethanes (HEUR) known to a person skilled in the art, hydrophobically modified acrylic acid copolymers (HASE) and polyetherpolyols.

Alkaline organic and/or alkaline inorganic compounds are suitable as neutralizing agents. Also preferred in addition to aqueous ammonia solutions are volatile primary, secondary and tertiary amines, such as ethylamine, dimethylamine, dimethylethanolamine, triethylamine, morpholine, piperidine, diethanolamine, triethanolamine, diisopropylamine, 2-amino-2-methylpropanol, 2-N, N-dimethylamino-2-methyl-propanol and mixtures of these compounds.

The slurry may contain silicone based defoamer. A defoamer or an anti-foaming agent is a chemical additive that reduces and hinders the formation of foam in industrial process liquids. The terms anti-foaming agent and defoamer are often used interchangeably. Commonly used agents are polydimethylsiloxanes and other silicones. The additive is used to prevent formation of foam or is added to break a foam already formed. Silicone-based defoamers are polymers with silicon backbones. The silicone compound consists of hydrophobic silica dispersed in a silicone oil. Emulsifiers are added to ensure the silicone spreads fast and well in the foaming medium. The silicone compound might also contain silicone glycols and other modified silicone fluids. Polydimethylsiloxane is a preferred antifoaming agent.

The slurry may contain pigment. Pigments which may be used are all pigments known to a person skilled in the art for the intended use. Preferred pigments for the aqueous formulations according to the invention are, for example, titanium dioxide, preferably in the form of rutile, barium sulfate, zinc oxide, zinc sulfide, basic lead carbonate, antimony trioxide and lithopone (zinc sulfide and barium sulfate). However, the aqueous formulations can also contain colored pigments, for example iron oxides, carbon black, graphite, luminescent pigments, zinc yellow, zinc green, ultramarine, manganese black, antimony black, manganese violet, Paris blue or Schweinfurt green. In addition to the inorganic pigments, the formulations according to the invention may also contain organic colored pigments, for example sepia, gamboge, Kasset brown, toluidine red, para red, Hansa yellow, indigo, azo dyes, anthraquinoid and indigoid dyes and dioxazine, quinacridone, phthalocyanine, isoindolinone and metal complex pigments. Titanium dioxide is a preferred pigment.

Slurry may also contain lightweight fillers such as perlite or polystyrene.

Slurry may contain pH modifiers such as magnesium hydroxide.

The following examples are presented to further illustrate some preferred embodiments of the invention and to compare them with methods and compositions outside the scope of the invention. Unless otherwise indicated, concentrations of materials in compositions and mixtures are given in percent by weight based upon the weight of calcined gypsum present.

Example 1—Specific Example of Wall Creation

One specific process of slurry creation, alum solution creation, pumping, and mixing system that was used to create a foamed gypsum wall is the following using a formulation of ingredients listed in TABLE 1.

TABLE 1

List of possible ingredients in the formulation with the maximum and minimum values that could be used to make a foamed gypsum material.

| Chemical name | Max % | Min % |
|---|---|---|
| Alpha and beta calcium sulfate hemihydrate | 98% | 50% |
| Calcium carbonate | 50% | 1% |
| Sodium citrate | 2% | 0% |
| Climate Stabilized Accelerator | 2% | 0% |
| Hydroxy methyl propyl cellulose | 5% | 0% |
| Hydroxy methyl ethyl cellulose | 5% | 0% |
| Acrylic latex (45% solid) | 20% | 0% |
| Foaming agent* | 5% | 0% |
| Styrene butadiene latex | 20% | 0% |
| Polycarboxylic ether | 5% | 0% |
| Amino methyl propanol | 1% | 0% |
| Calcium hydroxide | 1% | 0% |
| Tetrasodium pyrophosphate | 2% | 0% |
| Sodium polyacrylate | 2% | 0% |
| Citric acid | 1% | 0% |
| Diethylene triamine pentaacetic acid | 1% | 0% |
| Aluminum sulfate | 30% | 1% |
| Sodium trimetaphosphate | 2% | 0% |
| Water (g/100 g solids) | 200 | 30 |

*foaming agent was a mixture comprising 20 to 25% butyl diglycol, 7 to 15% sodium lauryl ether sulfate, and 3 to 5% alcohols C10-C16

Three different processes were performed with the composition of the invention to fill a cavity between wallboards as follows:

Process 1:
Dry materials were blended, packaged, and slurried in a batch process
Alum solution was created by mixing dry alum and water
The two solutions were pumped and combined via wye connector
The two solutions were mixed using a static mixer
The resulting mixed foaming solution was then transferred to a cavity
The material entering the cavity has ranged from having no expansion to completely expanded
The material in the cavity hardened and dried
Process 2:
Dry materials were blended, packaged
The packaged material was slurried in a continuous process
Alum solution was procured
The two solutions were pumped and combined via wye connector
The two solutions were mixed using a static mixer
The resulting mixed foaming solution was then transferred to a cavity
The material entering the cavity has ranged from having no expansion to completely expanded
The material in the cavity hardened and dried
Process 3:
Dry materials were blended, packaged
The packaged material was slurried in a continuous process
Alum solution was procured
The two solutions were fed into a dynamic mixer
The resulting mixed foaming solution was then transferred to a cavity
The material entering the cavity has ranged from having no expansion to completely expanded
The material in the cavity hardened and dried
Employing the composition of the present invention in the Processes 1, 2 and 3 expanded to fill the cavity.

Example 2

An aluminum sulfate solution and the carbonate solution were mixed to measure the amount of gas generated in time. It showed a large amount of gas is created when the two liquids were mixed but also the reaction continued for an extended period. This initial gas creation created a large pressure within the fluid that must be offset by the slurry's rheological properties or else rupture and collapse will occur as the material attempts to expand. TABLE 2 shows the results of this.

TABLE 2

(wt. % of components added to the water)

|  | wt % | wt % | wt % |
|---|---|---|---|
| Aluminum Sulfate | 3.7 | 5.1 | 6.8 |
| Calcium carbonate | 5.1 | 5.1 | 5.1 |
| Time (sec) | Vg/Vl* | Vg/Vl | Vg/Vl |
| 0 | 0.0 | 0.0 | 0.0 |
| 10 | 3.6 | 4.1 | 4.1 |
| 30 | 3.5 | 5.2 | 3.8 |
| 60 | 3.7 | 5.3 | 4.5 |
| 120 | 5.0 | 6.0 | 6.5 |
| 180 | 6.2 | 6.2 | 7.2 |

TABLE 2-continued (wt. % of components added to the water)

| | | |
|---|---|---|
| 300 | 8.0 | 8.2 |
| 1000 | | 13.7 |

*Vg is volume of gas generated; Vl is starting liquid volume

Example 3

Thermal and acoustical testing was performed on samples of bare cavity filler material (not between wallboards) of the invention of varying density, approximately 15-60 pcf. The thermal resistances per inch and noise reduction coefficient are shown. All values are enhanced relative to having an empty cavity within a cavity wall construction. TABLE 3 shows the results of this.

TABLE 3

| | Material Property Range | |
|---|---|---|
| | Low | High |
| Thermal Resistance, R-Value (h · ft$^2$ · °F./Btu) | 1.0 | 2.0 |
| Noise Reduction Coefficient, NRC Value | 10 | 20 |

Example 4

Three formulations comprising calcium sulfate hemihydrate, aluminum sulfate, and calcium carbonate, and cellulose thickener were tested for adhesion to United States Gypsum building materials using a POSI-TESTER adhesion testing device.

Formulation A was 91% calcium sulfate hemihydrate, 5% calcium carbonate and 4% aluminum sulfate.

Formulation B was 89.5% calcium sulfate hemihydrate, 5% calcium carbonate 4% aluminum sulfate, 0.5% HPMC and 1% polycarboxylate ether-based superplasticizer (dispersant).

Formulation C was 89.2% calcium sulfate hemihydrate, 5% calcium carbonate, 4% aluminum sulfate, 0.5% HPMC, 0.1% sodium citrate, and 0.2% CSA HPMC and 1% polycarboxylate ether-based superplasticizer (dispersant).

All percentages are weight percentages on a dry (water free) basis.

The material was formulated to adhere to different substrates such as gypsum board, gypsum fiber board, glass mat sheathing, and cement board.

The pressure required to cause failure is noted in TABLE 4. This test is a tensile like test.

TABLE 4

| Substrate | Formulation | Stress (Psi) |
|---|---|---|
| SECUROCK Brand Gypsum-Fiber Roof Board (Back) | A | 24 |
| | B | 27 |
| | C | 27 |
| SECUROCK Brand Gypsum-Fiber Roof Board (Face) | A | 29 |
| | B | 19 |
| | C | 26 |
| SHEETROCK Brand Gypsum Board (Back Side) | A | 39 |
| | B | 16 |
| | C | 23 |
| SECUROCK Brand Glass-Mat Sheathing Board (Face) | A | 26 |
| | B | 15 |
| | C | 18 |
| SECUROCK Brand Glass-Mat Sheathing Board (Back) | A | 25 |
| | B | 24 |
| | C | 20 |
| DUROCK Brand Cement Board | A | 29 |
| | B | 15 |
| | C | 27 |

Example 5

Formulations were subjected to compressive strength tests. Sample letter designations correspond to formulations in TABLEs 5 and 6. TABLE 5 shows the formulations. TABLE 6 shows the compressive strengths of the formulations.

TABLE 5

All values are weight percent of the dry (water free) ingredients

| Sample | Calcium sulfate hemihydrate | Calcium carbonate | Sodium Citrate | CSA | HPMC | HMEC | Sodium polycarboxylate ether | pH modifier | Aluminum Sulfate |
|---|---|---|---|---|---|---|---|---|---|
| A | 91.0 | 5.0 | | | | | | | 4.00 |
| B | 89.5 | 5.0 | | | 0.50 | | 1.0 | 0.01 | 4.00 |
| C | 89.2 | 5.0 | 0.1 | 0.2 | 0.50 | | 1.0 | 0.01 | 4.00 |
| D | 88.0 | 6.0 | 0.1 | 0.2 | 0.25 | | 0.5 | 0.01 | 5.00 |
| E | 87.5 | 6.0 | 0.1 | 0.2 | 0.25 | | 1.0 | 0.01 | 5.00 |
| F | 87.0 | 6.0 | 0.1 | 0.2 | 0.25 | | 1.5 | 0.01 | 5.00 |
| G | 87.7 | 6.0 | 0.1 | 0.2 | 0.50 | | 0.5 | 0.01 | 5.00 |
| H | 87.2 | 6.0 | 0.1 | 0.2 | 0.50 | | 1.0 | 0.01 | 5.00 |
| I | 86.7 | 6.0 | 0.1 | 0.2 | 0.50 | | 1.5 | 0.01 | 5.00 |
| J | 87.5 | 6.0 | 0.1 | 0.2 | 0.75 | | 0.5 | 0.01 | 5.00 |
| K | 87.0 | 6.0 | 0.1 | 0.2 | 0.75 | | 1.0 | 0.01 | 5.00 |
| L | 74.1 | 24.7 | | | | | | | 1.23 |
| M | 74.1 | 24.7 | | | | | | | 1.23 |
| N | 74.1 | 24.7 | | | | | | | 1.23 |
| O | 49.3 | 49.3 | | | | | | | 1.48 |
| P | 85.8 | 12.9 | | | | | | | 1.29 |
| Q | 74.1 | 24.7 | | | | | | | 1.23 |
| R | 85.8 | 12.9 | | | | | | | 1.29 |
| S | 85.8 | 12.9 | | | | | | | 1.29 |
| T | 85.8 | 12.9 | | | | | | | 1.29 |
| U | 74.1 | 24.7 | | | | | | | 1.23 |

TABLE 5-continued

All values are weight percent of the dry (water free) ingredients

| Sample | Calcium sulfate hemihydrate | Calcium carbonate | Sodium Citrate | CSA | HPMC | HMEC | Sodium polycarboxylate ether | pH modifier | Aluminum Sulfate |
|---|---|---|---|---|---|---|---|---|---|
| V | 74.1 | 24.7 | | | | | | | 1.23 |
| W | 74.1 | 24.7 | | | | | | | 1.23 |
| AA | 89.9 | 6.1 | | | | | | | 4.04 |
| AB | 93.8 | 4.0 | | | | 0.25 | | | 2.00 |
| AC | 92.3 | 4.0 | | | | 0.25 | | | 3.50 |
| AD | 90.8 | 4.0 | | | | 0.25 | | | 5.00 |

TABLE 6

| Sample | Density (pcf) | Water (g/100 g solids) | Compressive Strength (psi) |
|---|---|---|---|
| A | 54 | 55 | 186 |
| B | 17 | 75 | 32 |
| C | 18 | 80 | 67 |
| D | 16 | 75 | 42 |
| E | 19 | 65 | 60 |
| F | 20 | 60 | 62 |
| G | 15 | 75 | 44 |
| H | 14 | 70 | 38 |
| I | 16 | 70 | 53 |
| J | 15 | 80 | 37 |
| K | 15 | 80 | 23 |
| L | 88 | 50 | 2449 |
| M | 85 | 50 | 1684 |
| N | 87 | 50 | 1779 |
| O | 66 | 90 | 425 |
| P | 74 | 50 | 1056 |
| Q | 66 | 72 | 652 |
| R | 78 | 50 | 1139 |
| S | 78 | 50 | 1293 |
| T | 82 | 50 | 1162 |
| U | 72 | 72 | 773 |
| V | 70 | 72 | 825 |
| W | 70 | 72 | 854 |
| X | 73 | 60 | 1356 |
| Y | 62 | 80 | 725 |
| Z | 54 | 100 | 433 |
| AA | 51 | 56 | 112 |
| AB | 52 | 56 | 55 |
| AC | 53 | 56 | 6 |
| AD | 37 | 70 | 17 |

Figure 2:
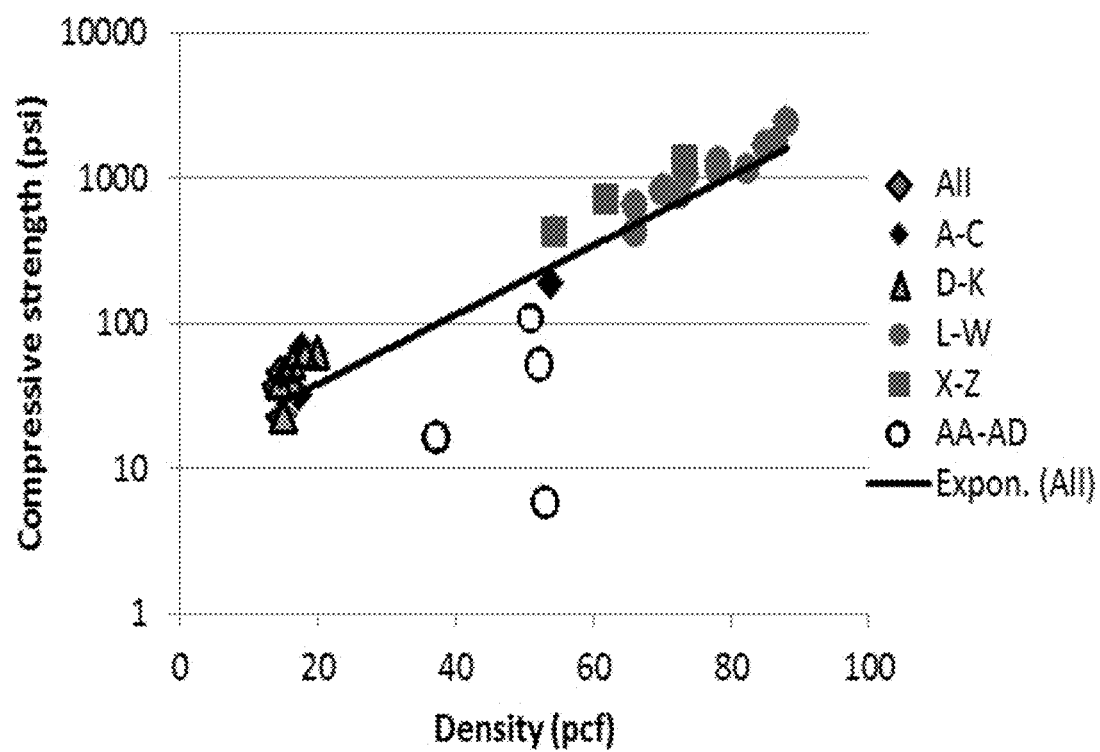
FIG. 2 shows compressive strength data from TABLE 8 plotted against the density of a sample.

FIG. 2 shows compressive strength data from TABLE 8B plotted against the density of the sample. The points of "All" are unable to be seen because they are behind the points of the individual tests.

Example 6—Zeolites

This example tests gas generated foaming systems for plaster using zeolites. The example was run to determine if a plaster formulation containing clinoptilolite zeolite (a natural zeolite) and sodium percarbonate will produce a foamed plaster mortar through the liberation of O2 gas and to demonstrate the catalytic oxidation of hydrogen peroxide in a plaster formulation containing clinoptilolite zeolite.

In this example, laboratory formulations were prepared using clinoptilolite zeolite as a constituent of the powdered formulation to demonstrate the concept of a gas generated foaming system for plaster. In Specimen A, sodium percarbonate was added to the plaster formulation as a dry admixture. In Specimen B, the plaster formulation containing zeolite was mixed at the desired test consistency using a 5.25% solution of hydrogen peroxide. A mix procedure of 1 minute soak, 1 minute mix by hand was used. TABLE 7 shows the formulations of Specimens A and B.

TABLE 7

Formulations of Specimens A and B

| Ingredients | Specimen A | Specimen B |
|---|---|---|
| Calcium sulfate hemihydrate (parts by weight) | 840 | 870 |
| PVOH powder (parts by weight) | 50 | 50 |
| Cellulose Fibers (parts by weight) | 20 | 20 |
| Zeolite (parts by weight) | 60 | 60 |
| Sodium Percarbonate (parts by weight) | 30 | 0 |
| Sodium Citrate Retarder (parts by weight) | 1 | 1 |
| Amount Formulation (grams) | 200 | 200 |
| Amount Deionized Water (grams) | 120 | — |
| Amount 5.25% H2O2 (grams) | — | 120 |

Figure 3:
FIG. 3 shows Specimen A made with Sodium Percarbonate resulting from Example 6.

FIG. 3 shows Specimen A made with Sodium Percarbonate.

Figure 4:
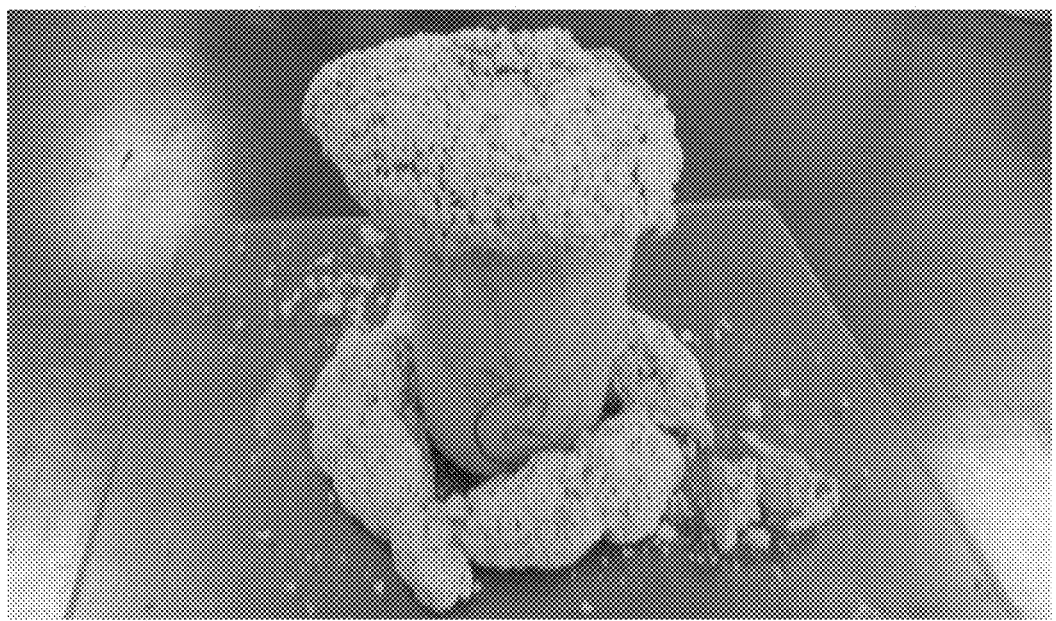
FIG. 4 shows Specimen B made with 5.25% Hydrogen Peroxide resulting from Example 6.

FIG. 4 shows Specimen B made with 5.25% hydrogen peroxide.

Example 7

This example tests: Zeolite/Sodium Percarbonate interactions to determine the interactional relationships between zeolite and sodium percarbonate in a standard plaster formulation. In this example laboratory samples were prepared and mixed using a Hobart mixer after soaking undisturbed in the mix water for 1 minute. A mix procedure of 1 minute soak, 2 minute mix at speed 2 with a wire whip was used. Viscosity was immediately determined. Three hundred grams of the mixed slurry was poured into a standard 32 oz. paper quart cup. The cup was placed in the drying oven for 1 day to develop sufficient strength before demolding. Calculated cast volume, volume increase, and dry density of the samples were determined after completely drying. TABLE 8 shows the formulations and results of Specimens 1-9.

TABLE 8

Interactional relationships between zeolite and sodium percarbonate in a standard plaster formulation (weights in grams)

| Specimens | 1 | 2 | 3 | 4 | 5 | 6 | 7 | 8 | 9 |
|---|---|---|---|---|---|---|---|---|---|
| Stucco | 493.35 | 488.35 | 483.35 | 480.85 | 475.85 | 470.85 | 468.35 | 463.35 | 458.35 |
| Clinoptilolite Zeolite | 0 | 0 | 0 | 12.5 | 12.5 | 12.5 | 25 | 25 | 25 |
| Sodium Percarbonate (13%-14% active O2) | 0 | 5 | 10 | 0 | 5 | 10 | 0 | 5 | 10 |
| PVOH | 6 | 6 | 6 | 6 | 6 | 6 | 6 | 6 | 6 |
| CSA | 0.05 | 0.05 | 0.05 | 0.05 | 0.05 | 0.05 | 0.05 | 0.05 | 0.05 |
| Sodium Citrate | 0.6 | 0.6 | 0.6 | 0.6 | 0.6 | 0.6 | 0.6 | 0.6 | 0.6 |
| Totals | 500 | 500 | 500 | 500 | 500 | 500 | 500 | 500 | 500 |
| Test Consistency (cc)* | 50 | 50 | 50 | 50 | 50 | 50 | 50 | 50 | 50 |
| Initial Vicat (min.)* | 91 | 30 | 22.5 | 75 | 33 | 22.5 | 81 | 37 | 28 |
| Cast Height (cm) | 3.6 | 3.6 | 3.7 | 3.6 | 4.6 | 5.1 | 3.6 | 5.3 | 6.3 |
| Calculated Cast Volume (cc) | 192.52 | 192.52 | 197.87 | 192.52 | 246.00 | 272.74 | 192.52 | 283.43 | 336.91 |
| Volume Increase (%) | 0.00 | 0.00 | 2.78 | 0.00 | 27.78 | 41.67 | 0.00 | 47.22 | 75.00 |
| Dry Density (lb/ft$^3$) | 73.64 | 72.55 | 70.16 | 73.49 | 57.36 | 50.47 | 73.52 | 48.79 | 39.95 |
| Brabender Viscosity (BU)* | 270 | 255 | 245 | 255 | 265 | 265 | 290 | 290 | 290 |

*In TABLE 8: Test consistency is the amount of cubic centimeters of water added per 100 grams of powder (dry ingredients). Initial Vicate (minutes) is a measure of set time of the mixture measured using a Vicat needle. Brabender Viscosity was determined using a 5/16 inch flag.

Example 8

This example tests Interactions of different forms of Zeolite and Sodium Percarbonate to determine the interactional relationships between zeolite and sodium percarbonate in a standard plaster formulation. In this example laboratory samples were prepared and mixed using a Hobart mixer after soaking undisturbed in the mix water for 1 minute. A mix procedure of 1 minute soak, 2 minute mix at speed 2 with a wire whip was used. Viscosity was immediately determined. Three hundred grams of the mixed slurry was poured into a standard 32 oz. paper quart cup. The cup was placed in the drying oven for 1 day to develop sufficient strength before demolding. Calculated cast volume, volume increase, and dry density of the samples were determined after completely drying. TABLE 9 shows the formulations and results of Specimens A1-D Example 9

This example tests functional properties of elastic additives such as PVOH, starch, sugar, gelatin, and polyethylene glycol in a lightweight plaster mix with Zeolite and Sodium Percarbonate. In this example laboratory samples were prepared and mixed using a mixer after soaking undisturbed in the mix water for 1 minute. A mix procedure of 1 minute soak, 2 minute mix at speed 2 with a wire whip was used. Viscosity was immediately determined. 300 grams of the mixed slurry was poured into a standard 32 oz. paper quart cup. The cup was placed in the drying oven for 1 day to develop sufficient strength before demolding. Calculated cast volume, volume increase, and dry density of the samples were determined after completely drying. TABLE 10 shows the formulations and results of Specimens E1-E7.

TABLE 9

Interactional relationships between zeolite and sodium percarbonate in a standard plaster formulation (weights in grams)

| Specimens | A1 | A2 | A3 | B | C | D |
|---|---|---|---|---|---|---|
| Stucco (Calcium sulfate hemihydrate) | 475.90 | 475.90 | 475.90 | 475.90 | 475.90 | 475.90 |
| Clinoptilolite Zeolite | 12.5 | 12.5 | 12.5 | 0 | 0 | 0 |
| Clinoptilolite Zeolite | 0 | 0 | 0 | 12.5 | 0 | 0 |
| 325 Mesh Zeolite A | 0 | 0 | 0 | 0 | 12.5 | 0 |
| 325 Mesh Zeolite B | 0 | 0 | 0 | 0 | 0 | 12.5 |
| Sodium percarbonate powder | 0 | 0 | 5 | 0 | 0 | 0 |
| Sodium percarbonate (13%-14% active O2) | 5 | 5* | 0 | 5 | 5 | 5 |
| PVOH (polyvinyl alcohol) | 6 | 6 | 6 | 6 | 6 | 6 |
| Sodium Citrate | 0.6 | 0.6 | 0.6 | 0.6 | 0.6 | 0.6 |
| Total | 500 | 500 | 500 | 500 | 500 | 500 |
| Test Consistency (cc) | 50 | 50 | 50 | 50 | 50 | 50 |
| Initial Vicat (min.) | 87 | 78 | 82 | 88 | 76 | 66 |
| Cast Height (cm) | 5.4 | 5.5 | 4.9 | 5.3 | 5.1 | 5.3 |
| Calculated Cast Volume (cc) | 288.78 | 294.13 | 262.04 | 283.43 | 272.74 | 283.43 |
| Volume Increase (%) | 50.00 | 52.78 | 36.11 | 47.22 | 41.67 | 47.22 |
| Dry Density (lb/ft$^3$) | 48.31 | 47.54 | 53.84 | 49.50 | 51.44 | 49.44 |

Notes
No CSA in the formulation causes a significant difference in set.
*Formulation A2 used sodium percarbonate that was ground with a mortar and pestle to a −40 mesh fraction.

TABLE 10

Interactional relationships between zeolite and sodium percarbonate in a standard plaster formulation (weights in grams)

| Specimens | E1 | E2 | E3 | E4 | E5 | E6 | E7 |
|---|---|---|---|---|---|---|---|
| Stucco | 481.90 | 475.90 | 475.90 | 475.90 | 475.90 | 475.90 | 475.90 |
| Clinoptilolite Zeolite | 12.5 | 12.5 | 12.5 | 12.5 | 12.5 | 12.5 | 12.5 |
| Sodium Percarbonate (13%-14% active O2) | 5 | 5 | 5 | 5 | 5 | 5 | 5 |
| PVOH | 0 | 6 | 0 | 0 | 0 | 0 | 0 |
| 70 mesh Type A gelatin | 0 | 0 | 6 | 0 | 0 | 0 | 0 |
| Corn starch | 0 | 0 | 0 | 6 | 0 | 0 | 0 |
| Starch | 0 | 0 | 0 | 0 | 6 | 0 | 0 |
| Dextrose | 0 | 0 | 0 | 0 | 0 | 6 | 0 |
| polyethylene glycol | 0 | 0 | 0 | 0 | 0 | 0 | 6 |
| Sodium Citrate | 0.6 | 0.6 | 0.6 | 0.6 | 0.6 | 0.6 | 0.6 |
| Total | 500 | 500 | 500 | 500 | 500 | 500 | 500 |
| Test Consistency (cc) | 50 | 50 | 56.4 | 50 | 50 | 50 | 50 |
| Initial Vicat (min.) | 73 | 96 | 87 | 62 | 69 | 86 | 57 |
| Cast Height (cm) | 4.9 | 6.1 | 5.0 | 4.8 | 4.9 | 4.6 | 4.4 |
| Calculated Cast Volume (cc) | 262.04 | 326.21 | 267.39 | 256.69 | 262.04 | 246.00 | 235.30 |
| Volume Increase (%) | 36.11 | 69.44 | 38.89 | 33.33 | 36.11 | 27.78 | 22.22 |
| Dry Density (lb/ft$^3$) | 53.51 | 41.01 | 51.33 | 49.96 | 53.40 | 56.80 | 59.55 |

Notes
E3 was very dry and stiff, 32 grams of water was added to the Hobart mix. The consistency was recalculated at 56.4 cc.

The invention is not limited by the above provided embodiments but rather is defined by the claims appended hereto.

What is claimed is:

1. A gypsum-based composition comprising a mixture of ingredients, based on 100 parts by weight of said ingredients on a water free basis, comprising:
   at least 70 wt. % calcium sulfate hemihydrate;
   a combination of compounds for generating $CO_2$ gas when mixed with water comprising:
   3 to 20 wt. % calcium carbonate and 3 to 15 wt. % at least one aluminum compound selected from aluminum sulfate and potassium aluminum sulfate for generating the $CO_2$ gas;
   0.2 to 5 wt. % cellulose thickener.

2. The composition of claim 1, wherein there is at least 87 wt. % calcium sulfate hemihydrate, 3 to 20 wt. % calcium carbonate, wherein there is 0.2 to 3 wt. % cellulose thickener, wherein the mixture ingredients further comprises; based on 100 parts by weight of said ingredients of said mixture, at least one of:
   0.1 to 1 wt. % chelating agent; and
   0.05 to 1 wt. % biocide.

3. The composition of claim 1, wherein there is at least 87 wt. % calcium sulfate hemihydrate, wherein there is 0.2 to 3 wt. % cellulose thickener,
   wherein the mixture ingredients further comprise; based on 100 parts by weight of said ingredients of said mixture, at least one additive selected from the group consisting of:
   0.1 to 10 wt. % acrylate thickener selected from at least one member of the group consisting of sodium polyacrylates and water-soluble copolymers based on acrylic and (meth)acrylic acid;
   0.1 to 10 wt. % casein, gum arabic, guar gum, tragacanth gum, starch, sodium alginate;
   0.02 to 1 wt. % citric acid, tartaric acid, malic acid, acetic acid, boric acid;
   0.02 to 2 wt. % alkali metal salt of citric acid;
   0.02 to 2 wt. % accelerator, the accelerator selected from the group consisting of potassium sulfate, an organic phosphonic compound, a phosphate-containing compound, and a calcium sulfate dihydrate and sugar-containing composition;
   0.1 to 5 wt. % foaming agent;
   1 to 20 wt. % latex polymer;
   0.01 to 1 wt. % 2-amino-2-methyl-1-propanol;
   0.05 to 2 wt. % polycarboxylate ether dispersant;
   0.05 to 2 wt. % polyphosphate;
   0.01 to 2 wt. % naphthalene dispersant or lignosulfonate dispersant;
   0.05 to 1 wt. % biocide;
   0.01 to 0.5 wt. % silicon based defoamer;
   1 to 5 wt. % inorganic particles selected from clay, pigment particles, and combinations thereof;
   0.05 to 1% polyethylene oxide (PEO).

4. The composition of claim 2, wherein the cellulose thickener is selected from at least one member of the group consisting of hydroxy propyl methyl cellulose, hydroxy ethyl methyl cellulose, hydroxy ethyl cellulose, methyl cellulose, methyl ethyl cellulose, ethyl cellulose, and carboxy methyl cellulose, wherein the chelating agent comprises sodium polyacrylate.

5. The composition of claim 3, wherein the ingredients comprise, based on 100 parts by weight of said ingredients:
   at least 70 wt. % calcium sulfate hemihydrate;
   3 to 20 wt. % calcium carbonate;
   3 to 15 wt. % aluminum sulfate;
   0 to 2 wt. % sodium citrate;
   0 to 2 wt. % the accelerator comprising calcium sulfate dihydrate and sugar;
   0.2 to 3 wt. %, cellulose thickener comprising hydroxy methyl propyl cellulose;
   0-3 wt. % said foaming agent, wherein said foaming agent is selected from the group consisting of alkyl benzene sulfonate, fatty acid salts, sodium lauryl sulfate, alkyl sulfate salts, sodium lauryl ether sulfate, sodium alkyl ether sulfate, sodium C14-16 olefin sulfonate, alpha-olefin sulfonates, phosphate esters, sulphosuccinates, alkyl phenol ether sulfates; and isethionates;
   0 to 20 wt. % latex comprising surfactant and latex polymer dispersed as solids in aqueous medium, said latex polymer is selected from at least one member of the group consisting of acrylic polymer and styrene butadiene polymer;

0 to 1 wt. % 2-amino-2-methyl-1-propanol;

0 to 1 wt. % modifier comprising calcium hydroxide;

0.1 to 2 wt. % dispersant selected from at least one member of the group consisting of polycarboxylate dispersant; polyphosphate dispersant, and naphthalene dispersant, wherein the polycarboxylate dispersant comprises a polycarboxylic ether dispersant, wherein the naphthalene dispersant is selected from at least one of beta-naphthalene sulfonate, naphthalene sulfonate formaldehyde condensate and sodium naphthalene sulfate formaldehyde condensate, wherein the polyphosphate dispersant is selected from at least one of the group sodium trimetaphosphate (STMP), sodium tripolyphosphate (STPP), potassium tripolyphosphate (KTPP), tetrasodium pyrophosphate (TSPP), tetrapotassium pyrophosphate, and tetrapotassium pyrophosphate (TKPP);

0 to 2 wt. % acrylate thickener selected from at least one member of the group consisting of sodium polyacrylate, acrylic acid/acrylamide and (meth)acrylic acid/acrylic ester copolymers;

0 to 1 wt. % chelating agent selected from
Diethylenetriaminepentaacetic acid (DTPA)
Ethylenediaminetetraacetic acid (EDTA)
Sodium polyacrylate
Polyphosphate, wherein if the polyphosphate is also present as a dispersant the polyphosphate present as a chelating agent is in addition to the polyphosphate present as a dispersant;

0 to 0.5 wt. % silicon based defoamer;

0 to 5 wt. % inorganic particles selected from clay, pigment particles, and combinations thereof;

0-10% wt. % of lightweight aggregate.

6. The composition of claim 1, wherein the aluminum compound are particles of powder encapsulated in a shell for a controlled release of the powder when adequate shear force is applied to the particles of powder encapsulated particles in the shell in a slurry comprising the particles during a mixing process comprising mixing the slurry.

7. The composition of claim 1, wherein the aluminum compound are particles coated with a water soluble coating.

8. The composition of claim 1, wherein the ingredients further comprise lightweight aggregate selected from at least one of perlite and polystyrene.

9. A method of making a foamed gypsum slurry, comprising mixing:
water; and
the composition of claim 1 to form the foamed gypsum slurry, wherein the water to calcium sulfate hemihydrate weight ratio to 0.2-2:1, this water being in addition to water of a latex aqueous medium, if present;
wherein the foamed gypsum slurry has 15 to 90 volume percent gas bubbles.

10. The method of claim 9, wherein the aluminum compound initially comprises alum powder particles encapsulated in a shell and there is a controlled release of the alum powder when sufficient shear force is applied to the encapsulated alum powder particles in the slurry during the mixing.

11. The method of claim 9, wherein the calcium carbonate is encapsulated with a coating comprising a member of the group consisting of ethyl cellulose, polyvinyl alcohol, gelatin, sugar, and sodium alginate.

12. The method of claim 9, wherein the aluminum compound is encapsulated with a coating comprising a member of the group consisting of ethyl cellulose, polyvinyl alcohol, gelatin, sugar, and sodium alginate.

13. A method of making a foamed gypsum product, comprising mixing:
water; and
the composition of claim 1 to form a foamed gypsum slurry, wherein the water to calcium sulfate hemihydrate weight ratio to 0.2-2:1;
wherein calcium sulfate hemihydrate in the foamed gypsum slurry converts to calcium sulfate dihydrate and sets and dries to form the foamed gypsum product,
wherein the foamed gypsum product resulting from the set and dried foamed gypsum slurry has a density of 10 to 55 pounds/cubic foot,
wherein the foamed gypsum product has a total void volume of 30 to 90 volume percent.

* * * * *